(12) United States Patent
Hou et al.

(10) Patent No.: US 12,483,626 B2
(45) Date of Patent: Nov. 25, 2025

(54) SENSOR SYSTEM

(71) Applicants: The Hong Kong University of Science and Technology, Hong Kong (CN); AI Chip Center for Emerging Smart Systems Limited, Hong Kong (CN); Shanghai Jiao Tong University, Shanghai (CN)

(72) Inventors: Xiaofeng Hou, Hong Kong (CN); Chao Li, Shanghai (CN); Luhong Liang, Hong Kong (CN); Kwang-Ting Cheng, Hong Kong (CN); Minyi Guo, Shanghai (CN); Jiacheng Liu, Shanghai (CN)

(73) Assignees: The Hong Kong University of Science and Technology, Hong Kong (CN); AI Chip Center for Emerging Smart Systems Limited, Hong Kong (CN); Shanghai Jiao Tong University, Shanghai (CN)

( * ) Notice: Subject to any disclaimer, the term of this patent is extended or adjusted under 35 U.S.C. 154(b) by 118 days.

(21) Appl. No.: 18/645,544

(22) Filed: Apr. 25, 2024

(65) Prior Publication Data

US 2024/0372918 A1    Nov. 7, 2024

Related U.S. Application Data

(60) Provisional application No. 63/499,982, filed on May 4, 2023.

(51) Int. Cl.
| | |
|---|---|
| *H04L 67/12* | (2022.01) |
| *G16Y 40/20* | (2020.01) |
| *H03M 1/18* | (2006.01) |
| *H03M 1/56* | (2006.01) |

(Continued)

(52) U.S. Cl.
CPC ............ *H04L 67/12* (2013.01); *G16Y 40/20* (2020.01); *H03M 1/18* (2013.01); *H03M 1/56* (2013.01); *H04N 5/76* (2013.01); *H04N 25/78* (2023.01)

(58) Field of Classification Search
CPC .......... H04L 67/12; H03M 1/18; H03M 1/56; H04N 5/378; H04N 5/76; H04N 25/78
See application file for complete search history.

(56) References Cited

U.S. PATENT DOCUMENTS

| | | |
|---|---|---|
| 10,296,070 B2 | 5/2019 | Kim |
| 11,423,851 B2 | 8/2022 | Cho et al. |

(Continued)

FOREIGN PATENT DOCUMENTS

WO    2021015208 A1    1/2021

*Primary Examiner* — Joseph J Lauture
(74) *Attorney, Agent, or Firm* — Woodard, Emhardt, Henry, Reeves & Wagner LLP; Charles J. Meyer

(57) ABSTRACT

The present disclosure provides a sensor system comprising a sensor array including a plurality of sensors and is configured to generate analog signals; an amplifier coupled to the sensor array, the amplifier configured to amplify the received analog signal; a buffer in communication with the amplifier, the buffer is configured to receive the amplified analog signal from the amplifier and cache the amplified analog signal therein; an analog-to-digital converter coupled to the amplifier and the buffer, and a signal selector configured to control delivery of the amplified analog signal from the amplifier.

19 Claims, 21 Drawing Sheets

(51) Int. Cl.
  *H04N 5/76* (2006.01)
  *H04N 25/78* (2023.01)

(56) References Cited

U.S. PATENT DOCUMENTS

2022/0157361 A1    5/2022  Natsui et al.
2023/0012505 A1*   1/2023  Heidari .............. G01R 33/0023

* cited by examiner

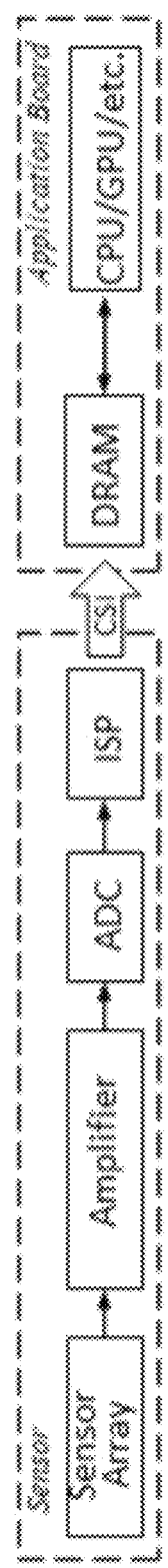
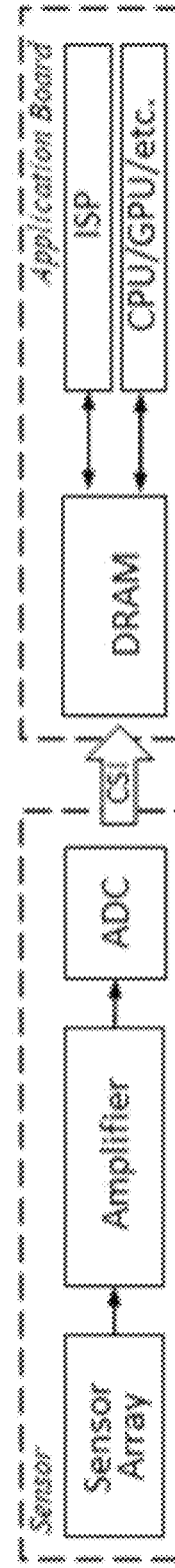
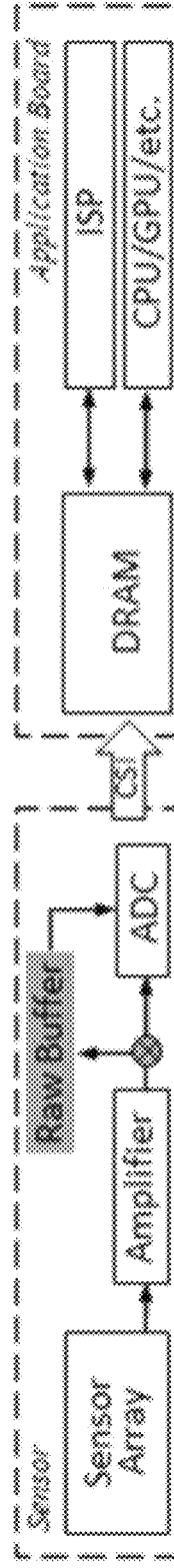
FIG. 3a
FIG. 3b
FIG. 3c

Algorithm 1: The probe-and-prediction process

Input: A pre-defined multi-modal task $M_i$, reference table $T_{ref}$, hierarchical control table $T_{ctrl}$, and modality routing list $R_{m_i}$.

Initialization: Power on the sensor of the first modality in $R_{m_i}$ and power off the other sensors.

for *modality* $m_i$ *in* $R_{m_i}$ do
    for *Exit* $e_j$ *in* $E_{m_i}$ do
        Check the probe flag (PF) at current exit.
        Calculate $PF(probe)$ acc. to Eq. (1).
        if $PF(A) \geq A_{expected}$ then
            Invoke multi-exit DNN APIs.
        if $IF(probe) > 0$ then
            if *The last exit of current modality* then
                Restore data for the next modality.
            Executing current modality.
        Reserve the state with checkpoint and exit.

FIG. 8

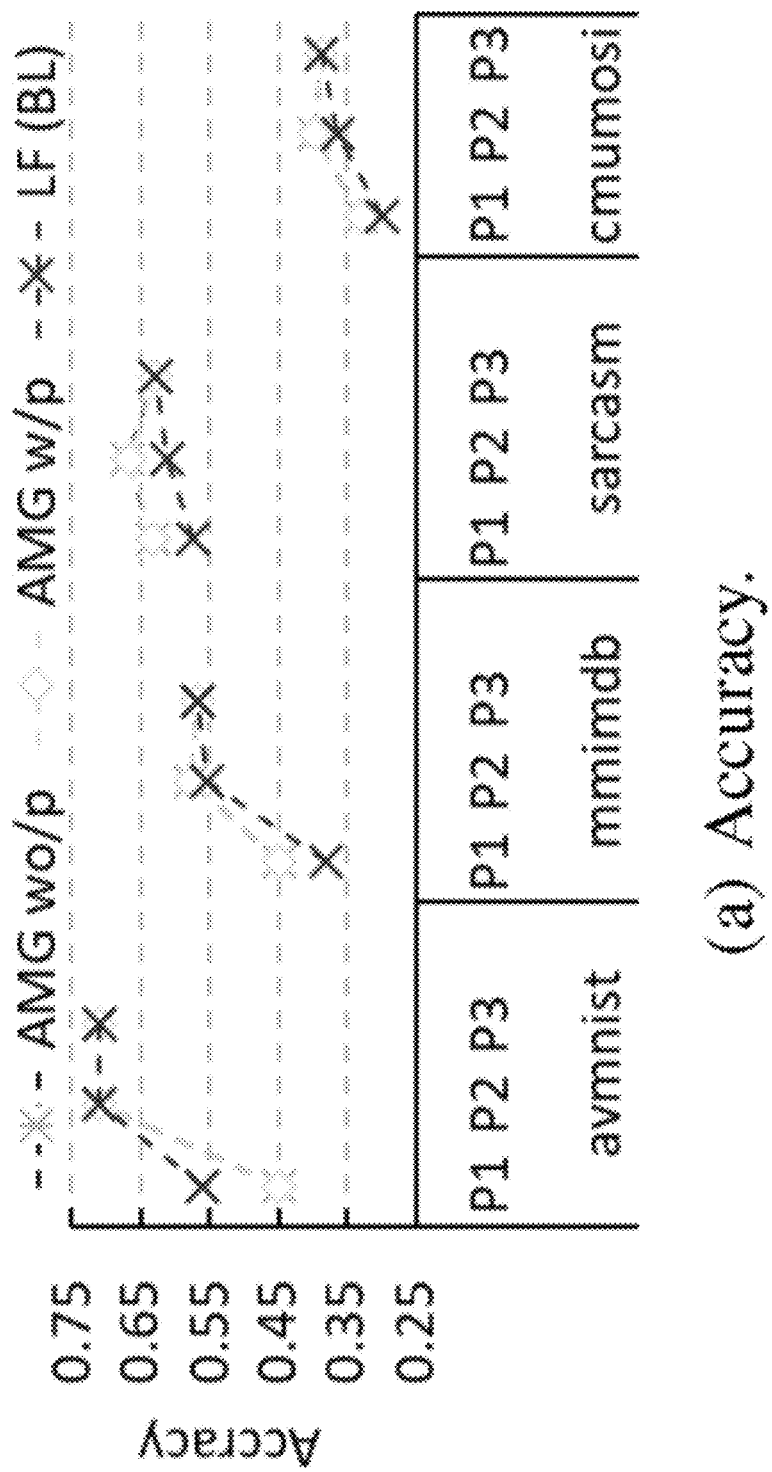
FIG. 14 (a) Accuracy.

(b) Per-inference energy.

(c) Latency distribution.

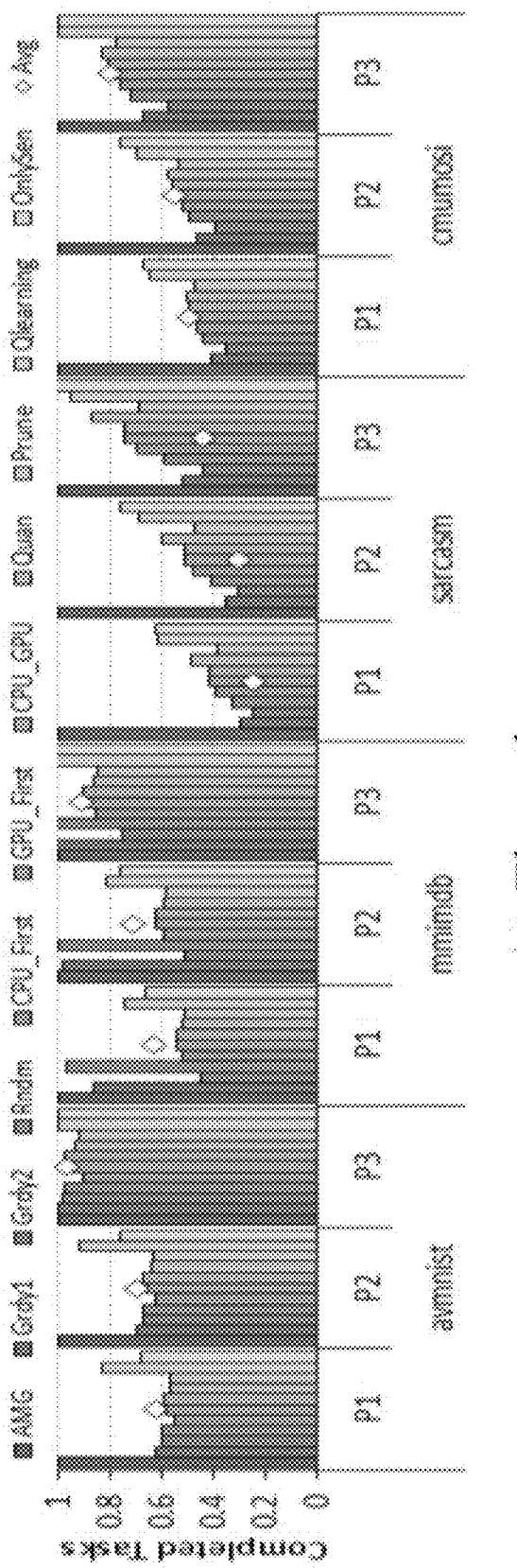
FIG. 16a (a) Throughput.

(b) Last time.

SENSOR SYSTEM

TECHNICAL FIELD

The present disclosure relates to a sensor system.

BACKGROUND

Multi-modal computing ($M^2C$) leverages a wide variety of modality sensors to capture different environmental data and then feeds the sensing data into perception modules that run multi-modal deep neural networks to generate insightful results. By federating multiple modalities, $M^2C$ has been shown to improve accuracy by up to 30%. Despite its accuracy superiority, $M^2C$ incurs incredible energy consumption. Particularly, its sensing components devour most of the energy budget, which could impede its deployment in many real-world applications.

AIoT (Artificial Intelligence of Things) scenarios where energy budgets are severely constrained. Typically, a multi-modal AIoT system integrates numerous sensors, such as high-resolution cameras and sophisticated microphones to sense the complementary environmental context. These sensors can consume up to 57% of the total power and up to 47% of the total energy in a $M^2C$ task.

$M^2C$ relies on multiple modality sensors to obtain the input data. As shown in FIG. 1, a conventional modality sensor is typically built with three main pipelined modules: 1) a sensor array that perceives the environmental signals and transfers them into analog electrical signals; 2) an analog-to-digital converter (ADC) that converts the analog signal into digital signals; 3) a digital signal processor (DSP) that pre-processes the digital signals and generates formatted data for the back-end multi-modal deep neural network (DNN) inference. ADCs and DSPs are generally well-developed components that can generate high-quality data for an AIoT application. $M^2C$ is a complex process that includes both sensing and computing processes. At the hardware layer, it includes a set of sensors that collect different modality information from the environment as well as a computing board that processes different modality data. At the software layer, it mainly runs multi-modal DNNs that take the sensing data as input and make inferences to realize different multi-modal AIoT applications.

When running the tasks, such as three most common modalities including image (I), audio (A) and text (T), on a NVIDIA Jetson Nano AIoT board, the $M^2C$ tasks drive power demand higher than the unimodal counterparts and also significantly increase the total energy consumption. Although the actual power usage of $M^2C$ task is comparable to the results of the uni-modal task, the much larger number of multiply-accumulate operations (MACs) in $M^2C$ leads to longer execution duration, thus leading to a higher energy consumption. About half of the energy is consumed by sensors, leaving very little energy for MACs and data movements.

Another critical challenge is how to provide quality $M^2C$ service in a power-saving mode that focuses on reducing the sensing energy consumption. Existing $M^2C$ efficiency optimization approaches are based on the fact that modalities exhibit very different importance to a task. They rely on a pre-analysis of all the modality data to select necessary modalities, thus reducing the backend computation effort of multi-modal DNNs. For example, the text modality performs better than visual or auditory modalities in a multi-modal language-emotion analysis; in automated vehicle applications, the radar modality may only be needed in extreme weather situations such as fogging and snowing. In a power-saving mode, however, the $M^2C$ system does not have a prior knowledge of all the modality data. Conventional designs would fail if a complex task demands different modality processing to meet accuracy and latency requirements.

SUMMARY

To overcome the shortcomings of existing technology, the present disclosure provides the following.

The present disclosure provides a sensor system. The sensor system comprises:
 a sensor array for generating an analog signal, the sensor array including a plurality of sensors and is configured to generate analog signals;
 an amplifier coupled to the sensor array, the amplifier being configured to amplify the received analog signal received from the sensor array;
 a buffer in communication with the amplifier, the buffer includes a non-volatile memory array, the buffer is configured to receive the amplified analog signal from the amplifier and cache the amplified analog signal in the non-volatile memory array;
 an analog-to-digital converter coupled to the amplifier and the buffer, and
 a signal selector configured to control delivery of the amplified analog signal from the amplifier;
 wherein, in a normal execution mode, the signal selector is configured to transmit the amplified analog signal from the amplifier to the analog-to-digital sensor; in the mode of storing the analog signal in a power semi-gating mode, the signal selector is configured to transmit the amplified analog signal from the amplifier to the buffer for processing and storage; in a mode of recovering the analog signal in the power semi-gating mode, the signal selector is configured to process the analog signal from the buffer and transmit the processed analog signal to the analog-to-digital converter.

In certain embodiments, the buffer includes a buffer array, and in the mode of storing analog signals in the power semi-gating mode, the signal sensor is configured to generate multiple voltage levels according to the signal sent to the buffer and to convert the multiple voltage levels into different resistance values for storage.

In certain embodiments, in the mode of recovering the analog signal in the power semi-gating mode, the signal selector is configured to apply a readout voltage in the buffer array so as to convert previously stored resistance values into a current signal, and transmit the current signal to the analog-to-digital converter.

In certain embodiments, the sensor system further comprises a digital signal processor. The digital signal processor is configured to process a current signal from the analog-to-digital sensor and transmit the processed current signal to the AIoT processor.

In certain embodiments, the buffer comprises a 1-bit gate signal register, and the 1-bit gate signal register is configured to control the sensor system to switch between normal execution mode and power semi-gating mode, wherein if the value in the 1-bit gate signal register is 0, it means that the sensor system operates in the normal execution mode, and if the value in the 1-bit gate signal register is 1, it means that the sensor system operates in the power semi-gating mode.

In certain embodiments, the buffer includes a buffer address register, and when the sensor system operates in the power semi-gating mode, the buffer address register is used to determine where to store and restore analog signals.

In certain embodiments, a number of sensors in the sensor system is the same as a number of buffer address registers.

In certain embodiments, the buffer further comprises a gate signal register and an address register, for providing a control interface for upper-layer applications.

In certain embodiments, the signal selector circuit is a 1-to-2 inverse multiplexing signal selector circuit.

In certain embodiments, the signal selector comprises a detection and prediction controller, the detection and prediction controller is configured to determine whether the sensor system is in the normal execution mode or in the power semi-gating mode according to a predetermined modality list that stores the optimal orders of modalities for different M²C tasks and according to a current performance of and a remaining power budget of the M²C task.

In certain embodiments, in initialization phase, the sensor system enters Ps-mode from N-mode and stays in Ps-mode unless modality mismatch occurs, wherein N-mode refers to normal execution mode, Ps-mode refers to storing mode of the power semi-gating mode.

In certain embodiments, if the energy is adequate while the performance is not satisfied, the modality mismatch occurs and then the sensor switches from Ps-mode to Pr-mode, Pr-mode refers to restoring raw data mode.

In certain embodiments, the optimal orders of modalities are determined by constructing a permutation tree covering all possible execution orders of the modalities, selecting the most probable execution sequence for each data input and obtaining the execution order with the most votes.

In certain embodiments, the ordering process of the execution comprises using an evaluator based on Multi-Bench with the extension of an energy model, each data sample of the training dataset of energy model represents an M²C task, denoted by <Dn,Un>, where Dn represents the modality data for the M²C task and Un represents a utility score calculated by the weighted sum of the accuracy, energy and latency for the M²C task, the training dataset of energy model is trained by a neural network, the execution order from one modality to next modality with a highest overall utility score in the training dataset is selected as the execution sequence with the most votes.

In certain embodiments, in the power semi-gating mode, if the performance requirements are met, the M²C task is completed with no more calculations; if the performance requirements are not met, the data is processed based on energy availability, where if energy is insufficient, checkpoints are used to save the execution state and wake up tasks until the accumulated energy exceeds a threshold.

In certain embodiments, the detection and prediction controller is configured to determine whether the next modality needs to be calculated based on the current performance of the multi-modal computing task and the remaining power budget, and if so, the controller processes the data of the next modality in advance by only running the sensor in the most energy-saving mode and actively determine whether to restore the original data of the next sensor and execute the corresponding modal data, where the detection and prediction controller compares the detected data with the modal list.

In certain embodiments, power and performance probes are inserted between different layers of the neural network.

In certain embodiments, multiple neural network outlets are added to different layers of the neural network to calculate the accuracy of the observation layer with intermediate features.

In certain embodiments, the detection symbol PF(probe) is used to explain the prediction result to predict whether there is remaining energy, $$PF(\text{probe}) = 1(A_{REF} - A_{pred} \leq 0) \tag{1}$$

$$A_{pred} = A_{REF} \times \left(1 - \frac{(A_{REF} - A_{ref}) \times A_{probe}}{A_{REF}}\right) \tag{2}$$

wherein, $P_{ref}$ and $A_{ref}$ represent the reference power and performance respectively, and the predicted power and performance are expressed as $P_{REF}$ and $A_{REF}$, and 1 is a Bool function.

The present disclosure provides a new modality sensor pipeline architecture to cap sensor power while maintaining situation awareness (raw data streaming) and a new AIoT system management strategy to proactively fix the performance penalty issue.

The improved energy-limited multi-modal AIoT systems actually run M²C tasks in a highly efficient way, and the energy of modality sensors can be reduced in a way that does not affect situation awareness. Therefore, the present disclosure includes architectures that allow for turning off only the energy consuming modules while maintaining sensor data flow.

BRIEF DESCRIPTION OF THE DRAWINGS

Exemplary embodiments of the disclosure are described in the following with respect to the attached figures. The figures and corresponding detailed description serve merely to provide a better understanding of the disclosure and do not constitute a limitation whatsoever of the scope of the disclosure as defined in the claims.

FIG. 3a shows a typical AIoT architecture, FIG. 3b shows a partial decoupled architecture, and FIG. 3c shows a fully decoupled architecture according to one embodiment of the present disclosure.

FIG. 8 is a diagram illustrating the details of the mechanism of the process of the present disclosure according to one embodiment of the present disclosure.

FIG. 16a and FIG. 16b respectively show comparison of throughput (normalized to AMG) and system last time under various energy budgets between the prior art and one embodiment of the present disclosure.

DETAILED DESCRIPTION

Figure 1:
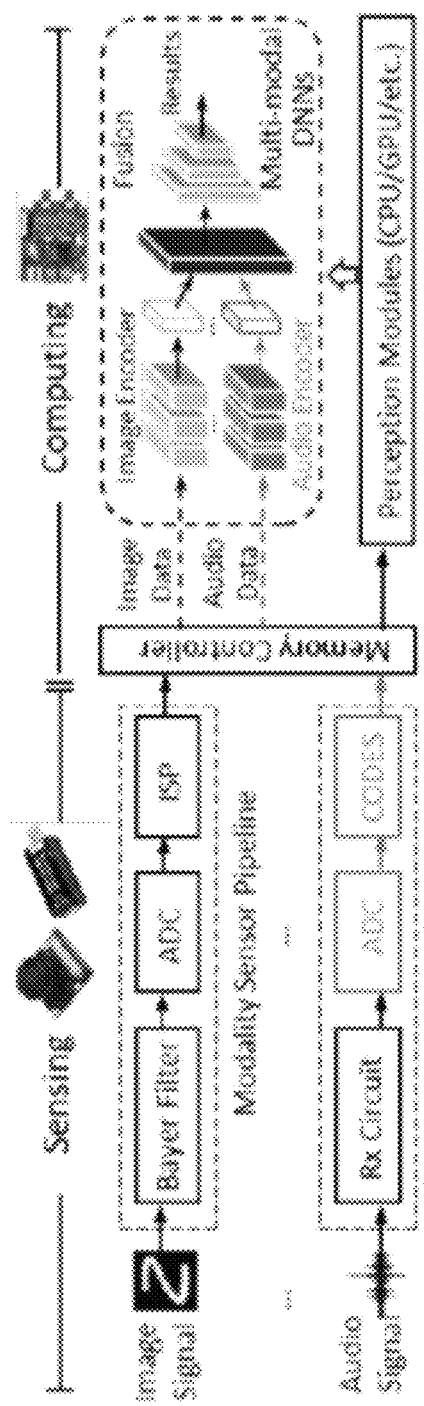
FIG. 1 illustrates a diagram of a modality sensor which is typically built with three main pipelined modules according to the prior art.

The disclosure will be more fully described below with reference to the accompanying drawings. However, the present disclosure may be embodied in a number of different forms and should not be construed as being limited to the embodiments described herein.

The present disclosure first relates to AMG, an innovative hardware/software (HW/SW) co-design solution tailored to multi-modal AIoT systems. The key behind AMG is modality gating (throttling) that allows for adaptively sensing and computing modalities for different tasks, while situational awareness, energy conservation, and execution latency should be balanced. AMG introduces a novel decoupled modality sensor architecture to support partial throttling of modality sensors, for saving AIoT power and maintaining sensor data flow. AMG also features a smart power management strategy based on the new architecture, allowing the device to initialize and tune itself with the optimal configuration.

In the present disclosure, an adaptive modality gating (AMG) solution introduces a decoupled modality sensor architecture that allows for adaptively sensing and computing modalities for different tasks is proposed, for energy-efficient, non-disruptive modality throttling from the sensor side. At the hardware layer, a novel decoupled sensor architecture that supports modality semi-gating (i.e., partially throttle the sensor) is introduced. Instead of turning off the whole sensors, only energy-hungry modules (e.g., ADCs and DSPs) are gated to save energy while maintaining situation awareness. At the system layer, an optimized modality activation mechanism is implemented that follows the best modality gating orders and adjusts the $M^2C$ task smartly. It can greatly improve AIoT efficiency while ensuring satisfactory accuracy and latency and reducing performance penalty if additional modalities must be progressively activated. In certain embodiments of the present disclosure, an adaptive in-situ $M^2C$ system is proposed. AMG can enable highly-efficient in-situ $M^2C$ in a complex environment.

Certain embodiments of the present disclosure propose a sensor system. The sensor system comprises a sensor array including a plurality of sensors and is configured to reduce the energy of modality sensors. An amplifier is coupled to the sensor array, the amplifier configured to amplify the received analog signal. A buffer is in communication with the amplifier, the buffer includes a non-volatile memory array, the buffer is configured to receive the amplified analog signal from the amplifier and cache the amplified analog signal therein. An ADC is coupled to the amplifier and the buffer, and a signal selector is configured to control delivery of the amplified analog signal from the amplifier. In the normal execution mode, the signal selector is configured to transmit the amplified current signal from the amplifier to the ADC; in the mode of storing the analog signal in the power semi-gating mode, the signal selector is configured to transmit the amplified analog signal from the amplifier to the buffer for processing and storage; in the mode of recovering the analog signal in the power semi-gating mode, the signal selector is configured to process the analog signal from the buffer and transmit the processed analog signal to the analog-to-digital converter.

In the present disclosure, an adaptive modality gating (AMG), a novel HW/SW co-design that augments AIoT systems and enables efficient multi-modal computing, is provided. AIoT system can be modulated by gating modality, so as to avoid turning on/off a modality repeatedly in a fine-grained manner or delay tasks for energy conservation for a given inference task.

Figure 2:
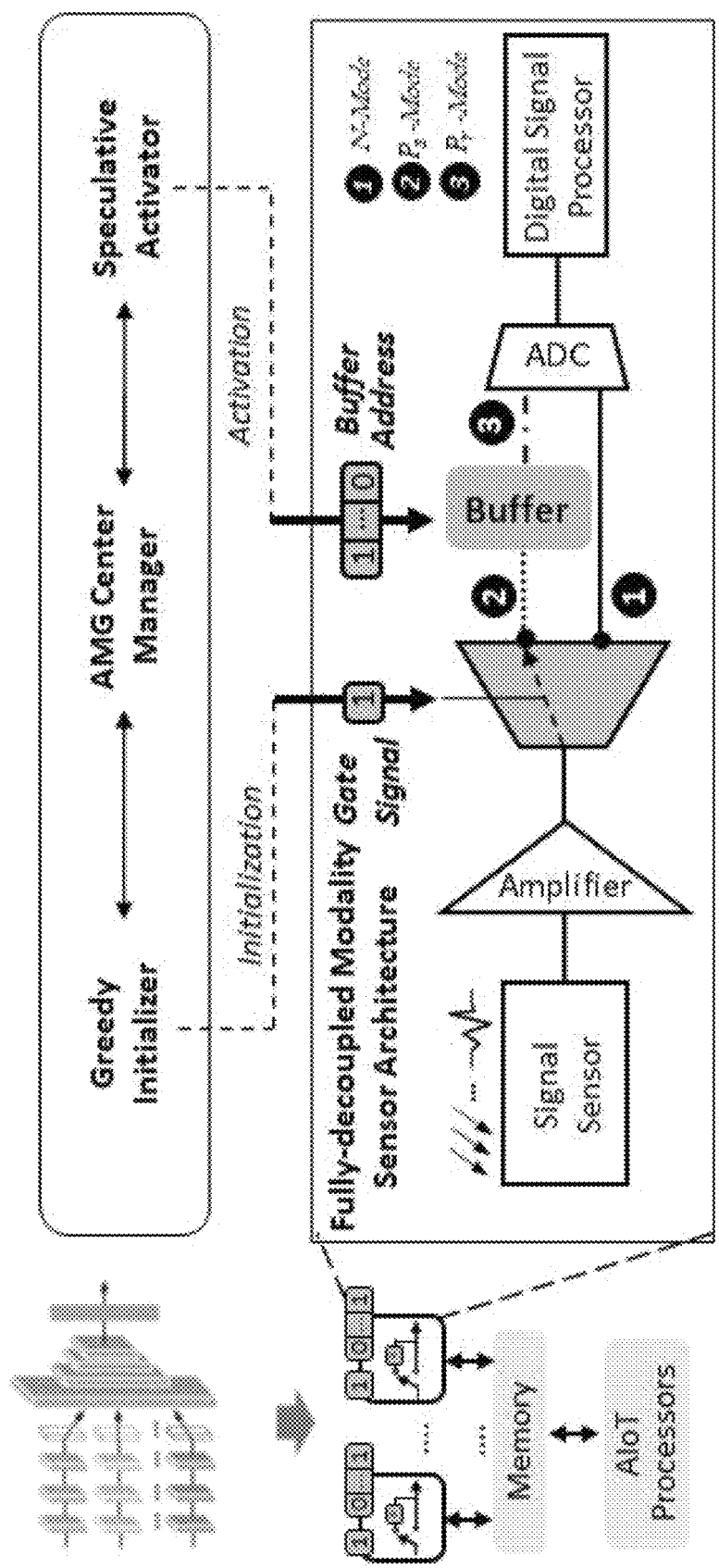
FIG. 2 illustrates a diagram of showing the overall system architecture according to one embodiment of the present disclosure.

FIG. 2 depicts the overall system architecture in accordance with certain embodiments of the present disclosure. AMG, for the first time, leverages both hardware and software based tuning knobs to jointly control the sensing and computing power of each modality for every data sample. At the hardware layer, architectural support for low-power data sensing is introduced. At the software layer, the modality execution paths can be adaptively orchestrated and controlled based on the feedback information from $M^2C$ applications. In total, the present embodiment allows power-constrained AIoT devices to execute $M^2C$ tasks while satisfying the accuracy and latency requirements.

In the architecture level of the present embodiment, AMG introduces a fully-decoupled sensor architecture and divides the sensor pipeline into a lightweight frontend that senses the environment and a power-hungry backend that converts the data. The backend of unnecessary modalities is disabled and in the meantime temporarily hold the associated analog signal in a buffer. Based on the $M^2C$ applications' requirement, backend data streaming can be selectively released. The significance of such an architecture design is that it allows one to partially throttle the modality sensor pipeline and enable sensor semi-gating.

Further, the present disclosure can optimize speculative sensor activation. AMG initializes the AIoT platform with a carefully chosen route of modality activation. The present embodiment provides a greedy initialization model that could maximize the likelihood of optimal modality gating in a dynamic environment. In case that complex $M^2C$ tasks require additional computation to ensure accuracy, a speculative activation scheme can be used for enhancing. AMG inserts lightweight probes to check each task's progress. By proactively activating necessary modality sensors and parallelize data processing, a better design tradeoff with low latency cam be achieved.

FIG. 3a illustrates a diagram traditional sensors have a unified, static architecture. Such unified, static architecture does not support dynamic modality gating. FIG. 3b is a diagram showing a partially decoupled sensor architecture, which illustrates how current AIoT systems move the DSP component from the sensor part to the compute board. However, it fails to support adaptive modality throttling since it does not decouple the energy-hungry ADC component. FIG. 3c is a diagram of a fully-decoupled sensor architecture according to an embodiment of the present disclosure. The fully-decoupled sensor architecture of the embodiment of the present disclosure allows one to store the analog signal of a modality at the sensor array end, and then optionally decides whether to execute the power-consuming ADC/DSP according to the actual requirement of the $M^2C$ task. This architecture supports highly flexible modality gating as shown in FIG. 2.

It thus can be seen that in the fully-decoupled sensor architecture, a small buffer is used to actually decouple the two parts of the modality pipeline, for eliminating the high energy consumption of the data sensing process while avoiding raw data loss. For a few complex samples, it needs to calculate more modalities to achieve better accuracy. By adaptively choosing proper modalities for different data samples, the power/energy demand of $M^2C$ tasks are greatly reduced.

In certain embodiments of the present disclosure, three sensor operation modes can be determined by the performed $M^2C$ tasks. Specifically, the sensor has one normal execution mode (N-Mode) and two power semi-gating modes (P-Modes) including the store (Ps-Mode) raw data mode and restore (Pr-Mode) raw data mode. In the N-Mode, the sensor acquires and transmits the modality data to the AIoT processor. In the Ps-Mode, the sensor temporarily saves the analog signal coming from the signal sensor and amplifier into a buffer. Then, the upper system-level controller (i.e., the AMG central manager) will decide whether to switch the sensor to its Pr-Mode where it performs ADC and DSP processing according to the $M^2C$ application's accuracy requirement.

Figure 4:
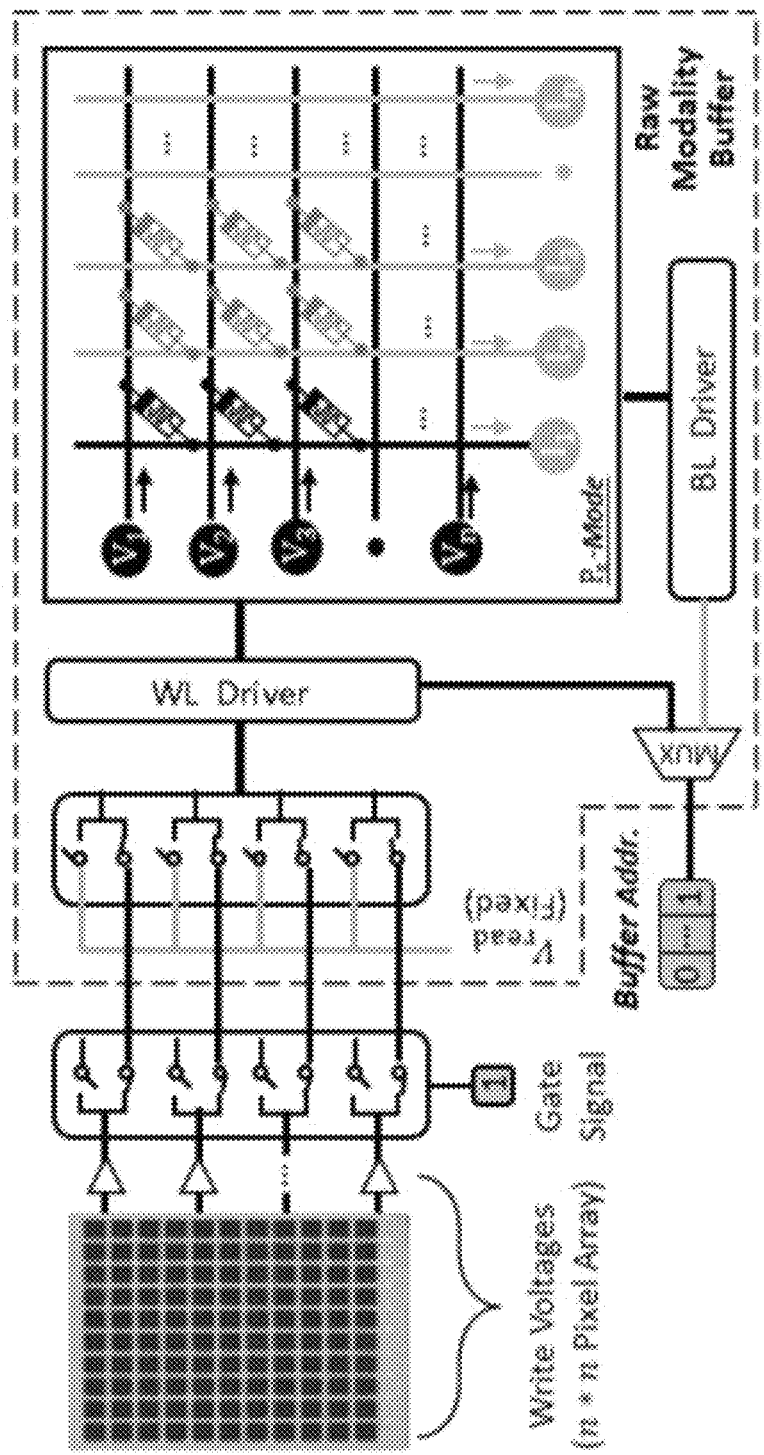
FIG. 4 is a diagram of hardware-based modality sensor modulation according to one embodiment of the present disclosure.

In certain embodiments of the present application, a small buffer, i.e., raw modality buffer to preserve the analog signal is used, as shown in FIG. 4. The buffer can include a non-volatile storage array, or can comprise other kinds of storage array. Each cell of the array can be a non-volatile memory device that can hold one or more analog signals. Considering a camera whose sensor is a w×h pixel array, with n signals and m states for each pixel, such as a 256×256 pixel array, with each pixel containing 3 RGB signals each of which has 256 states, the buffer needs to represent 256×256×3×8 bits to save the analog signals of a picture. Assuming that a memory cell supports 8 bits, the buffer size would be 24 KB.

Generally, the buffer can be implemented with a variety of non-volatile memory devices. Basically, it is better to implement the buffer with emerging technologies such as resistive random access memory (RRAM). Nonvolatile storage devices have been increasingly adopted by various AIoT devices.

In the present embodiment, a 1-bit gate signal register can be leveraged to control the sensor to switch between the N-Mode and P-Mode, as shown in FIG. 4. The value 0 means working in N-Mode while 1 means P-Mode. The gating signal is transferred to control the 1-to-2 MUX module via the on-chip control bus. When working in the P-Mode, a buffer address register is used to determine where to store and restore the analog signals. When storing analog signals (in Ps-Mode), the buffer array is programmed with multiple voltage levels generated by the signal sensor. The voltages pass through cells and are converted into different resistance values for storage. If the analog signal needs to be read (in Pr-Mode), a read voltage is added to the buffer array, then the previously stored resistance becomes a current signal, which is then converted into data by the ADC and DSP and transmitted to the AIoT processor to process. The binary value of the gate register should be larger than the number of sensors, i.e. for n sensors, the gate register should have x bits where $2x \geq n$. Meanwhile, there should be n buffer address registers for the n sensors.

In certain embodiments of the present application, an optimized sensor activation strategy tailored to multimodal AIoT is provided.

As shown in FIG. 2, a mechanism has been used by a detection and prediction controller for determining modality ordering strategy, the mechanism includes a greedy initialization mechanism, AMG Center Manager, and speculative activator, which determine the best modality configuration offline and only use online adaptation to further improve performance. The purpose of the initialization is to automatically learn the optimal modality execution orders.

Figure 5:
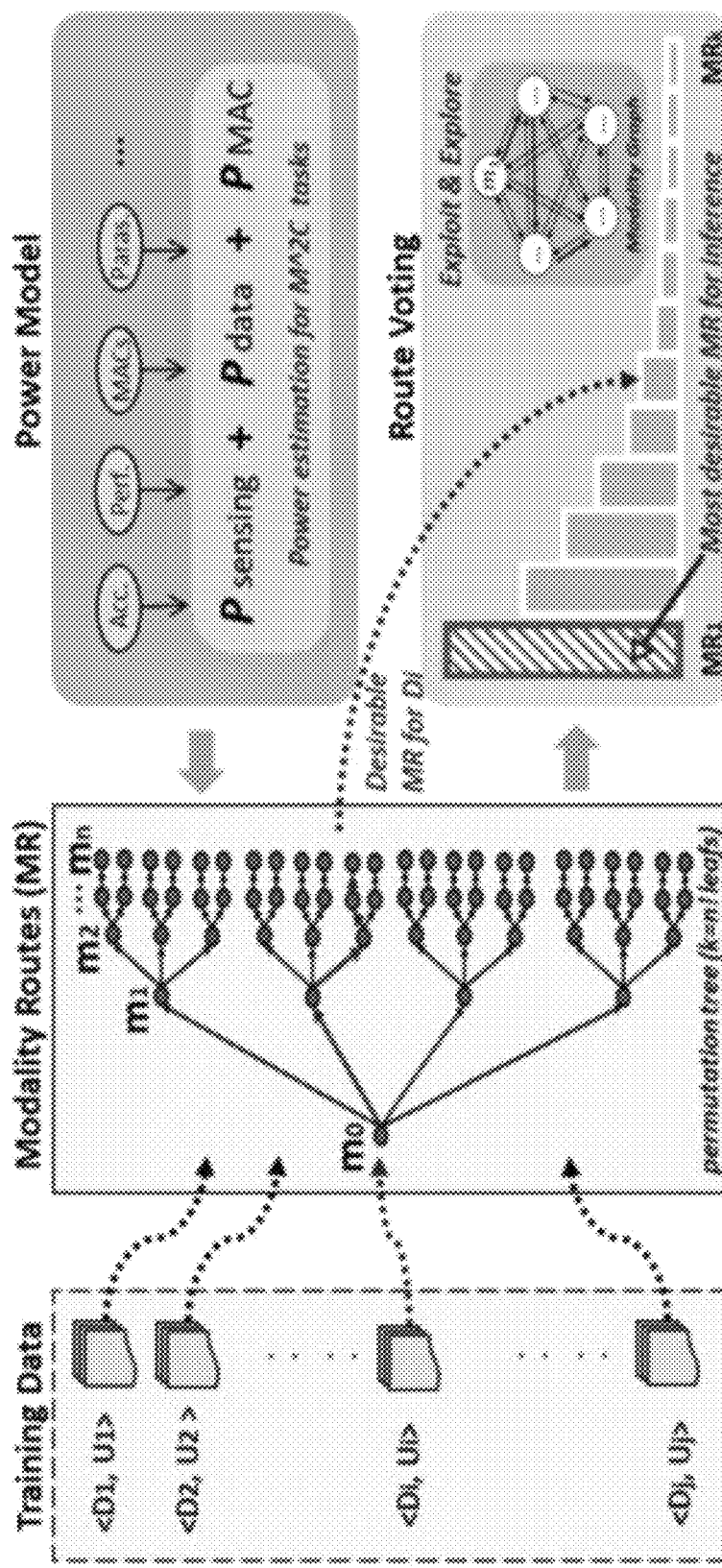
FIG. 5 is a diagram of modality ordering process according to one embodiment of the present disclosure.

Modality ordering strategy is expressed as follows. In the initialization phase, the priority list of hardware modality (initialization configuration) should be determined so as to specify the order of modality activation during runtime. The greedy initialization approach is provided to identify the activation order that benefits the greatest number of data inputs. FIG. 5 shows the initialization processes. For AIoT systems with a limited number of modalities, a permutation tree that covers all the possible execution orders of modality is constructed at first. Each execution order is determined as a modality route (MR). Since AIoT applications have different modality preferences, some features play a dominant role in terms of prediction accuracy. During the training process, each data input votes its most desirable MR. Finally, the MR with the most votes will be selected.

If the numbers of sensors or the types of modalities grow, the complexity of the above process may greatly increase. In this case, the problem with a complete graph can be modeled, where vertices represent different modalities and each edge corresponds to the sequential execution (transition) from one modality to the next. There is a direct transition between any two states that can be executed sequentially. Each transition has a set of metrics that reflect the outcomes of the transition. The graph model provides a resource-conservative representation of the utilities of various modality execution orders. The graph model can be trained with the classic exploring-and-exploiting approach. To be specific, the present embodiment provides an evaluator based on MultiBench with the extension of an energy model that considers the computing energy of data movement and MAC operations as well as the sensing energy to train the strategy based on the previous work. Each data sample of the training dataset represents an $M^2C$ task, denoted by <Dn, Un>, where Dn represents the modality data for this task and Un is a utility score calculated by the weighted sum of the accuracy, energy and latency (obtained from the evaluator) for the task. The weights are automatically searched using the optuna tool. The loss function is the overall loss of the utility score for all the training data samples. After training, the transition with the highest total utility score means that it is the ideal candidate for most of the data samples.

The above ordering process ultimately outputs a modality list, which stores the optimal orders of modalities for different $M^2C$ tasks. Besides, a power and performance reference table can be obtained after the offline profiling process. In the table, the empirical power consumption and performance of a modality is recorded when it is executed at different layers.

Because the optimal modality order only statistically satisfies most of the data samples, an online adaption should be used to guarantee the accuracy of the inference tasks, particularly for some non-ideal data input. It may cause a key performance issue, i.e. modality mismatch. For some complex tasks, it is not unusual that the first-ranked modality cannot provide the necessary accuracy. Then it would incur a long delay since it is needed to restore the modality data of more sensors from their raw input buffers and perform extra computation in serial. To address this, AMG according to the present embodiment monitors the execution progress of the current modality. Then it uses a speculative activation to proactively restore and compute the data of the next modality that will be computed according to the modality routing list.

Figure 6:
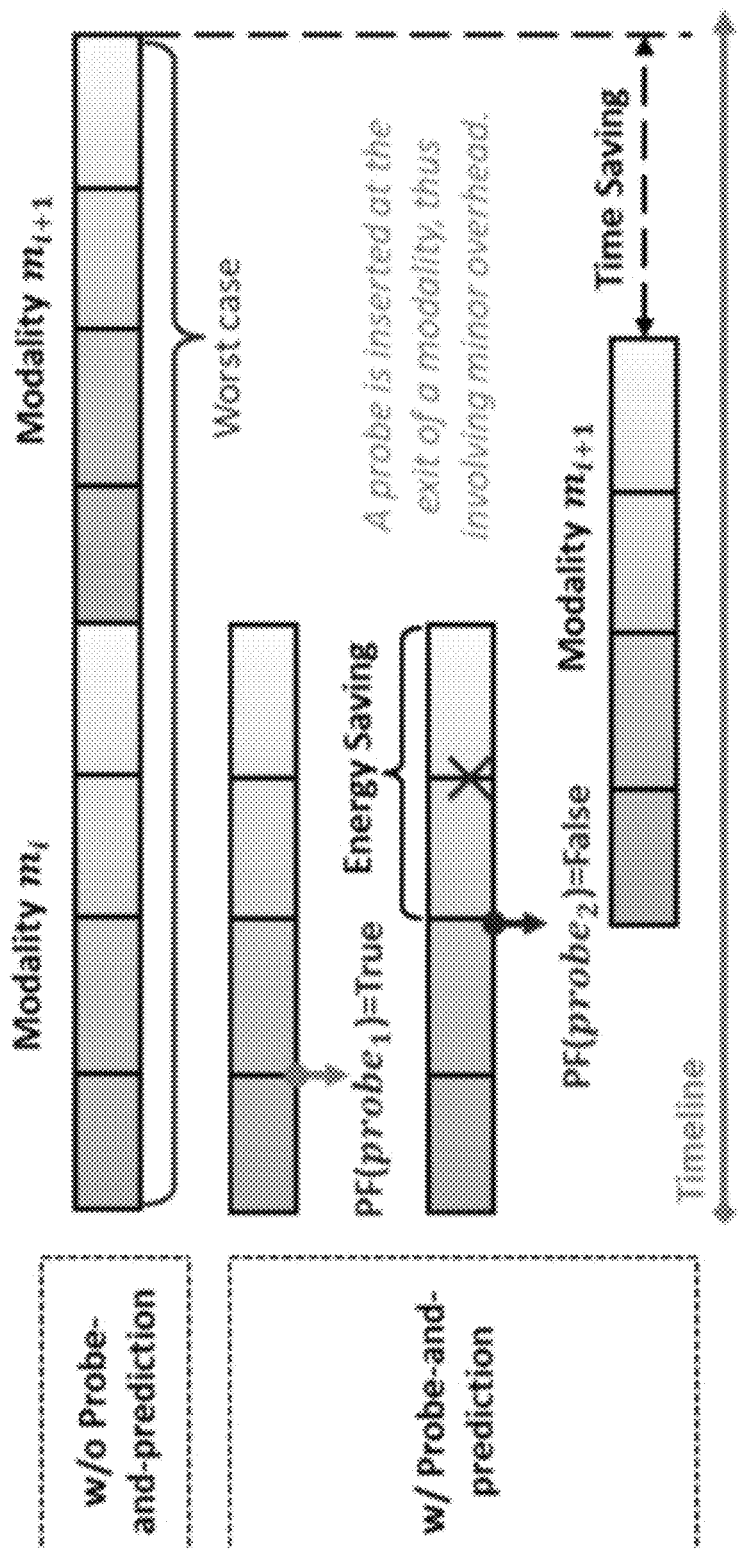
FIG. 6 is a diagram of speculative modality activation according to one embodiment of the present disclosure.

A probe-and-prediction controller for speculative modality activation according to the present embodiment is shown in FIG. 6, which determines whether the next modality needs to be computed based on the current performance of the M²C task and the remaining power budget. If the next modality needs to be computed, the controller will process the data of the next modality, such as $m_{i+1}$, in advance. First, it only operates the sensor of the most energy-efficient modality rather than all the sensors in N-Mode which often leads to much higher sensing energy at a time, thus improving energy efficiency and avoiding unnecessary energy waste. Second, it proactively determines whether to restore the raw data of the next sensor and execute the corresponding modality data.

Since neural network applications have a layer-by-layer execution structure, some power and performance probes can be inserted between different layers. Each probe monitors the current power consumption and the performance such as latency, and accuracy of the M²C task. To monitor the energy consumption and execution latency of tasks, AIoT devices have integrated many system performance monitor tools such as jtop. Some neural network exits are added to calculate the accuracy at the observed layer with intermediate features, so as to observe the performance of the M²C task at the layer level.

Figure 7:
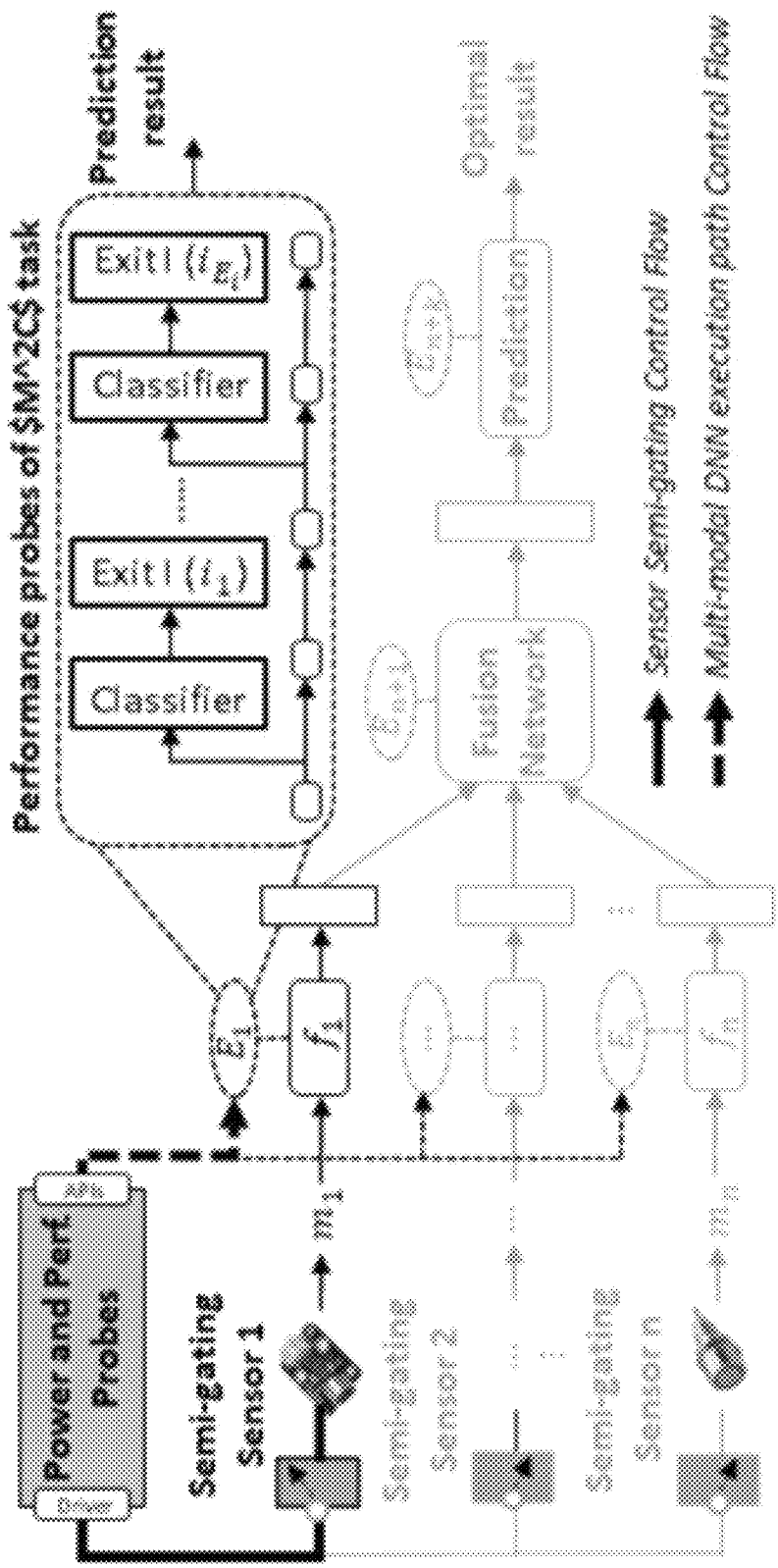
FIG. 7 is a diagram illustrating performance probes of the M²C task based on the neural network early exit techniques according to one embodiment of the present disclosure.

As shown in FIG. 7, the exits are implemented by adding a few neural network layers to generate a prediction of the present immediate feature based on the previous work.

To make the decision, the probe-and-prediction controller compares the data from the probe with the reference table which is built offline. Assuming that the performance from the probes is denoted by $A_{probe}$. The reference performance is denoted by $A_{ref}$. The performance for completing the whole modality is formulated as $A_{REF}$. Then, a probe flag (PF) is used as a prediction result to predict whether the performance $A_{pred}$ will be satisfied. Its value is computed as PF(probe) as per the following formula (1) and (2).

$$PF(\text{probe}) = 1(A_{REF} - A_{pred} \leq 0), \quad (1)$$

$$A_{pred} = A_{REF} \times \left(1 - \frac{(A_{REF} - A_{ref}) \times A_{probe}}{A_{REF}}\right), \quad (2)$$

wherein 1 is a Bool function, $A_{probe}$ is performance data collected at runtime while $A_{ref}$ and $A_{REF}$ are determined by heuristic statistics. If there is any remaining energy, it can be predicted in a similar way. The details of this mechanism are shown in FIG. 8.

As shown in FIG. 8, the probe-and-prediction process can be performed as follows. The input is a pre-defined multi-modal task Mi, reference table $T_{ref}$, hierarchical control table $T_{ctrl}$ and modality routing list $R_m$. The above parameter has been obtained previously. In the initialization step, power on the sensor of the first modality $R_m$ in and power off the other sensors. For modality $m_i$ in $R_m$, the step is continuing. Then for Exit $e_j$ in $E_i$, the probe-and-prediction strategy is implemented, including checking the probe flag at current exit and calculating PF(probe) according to the above formula (1). Then hierarchical execution control is proceeded. If PF(A) $\geq A_{empirical}$, multi-exit DNN APIs is invoked. If PF(probe) $\geq 0$, then if the last exit of current modality appears, the process can restore data for the next modality. If PF(probe) $\geq 0$, then if the last exit of current modality does not appear, the step proceeds to executing current modality. Then, after the process completes, reserve the state with checkpoint and exit.

The AMG Central Manager is provided for being responsible for coordinating all of them and modulating modality execution. As observed in the above portion, for most simple data samples, only the first sensor works in N-mode while the others work in Ps-Mode. To handle the very complex execution environment of in-situ M²C, more sensors should be switched into their Pr-Mode. AMG is further driven by the state diagram shown in FIG. 9. In the AMG Central Manager, three operating states include checking point, normal execution and early exit have been defined. There are three inputs that affect these states, indicating if the execution should be advanced or not. A checkpoint is created by interrupting the AIoT execution temporally and the system states are saved into non-volatile storage.

Normal execution means computing the modality until the expected performance is achieved. It can be interrupted by a checking point state or an early exit state. Early exit happens when the expected performance has been achieved.

Figure 9:
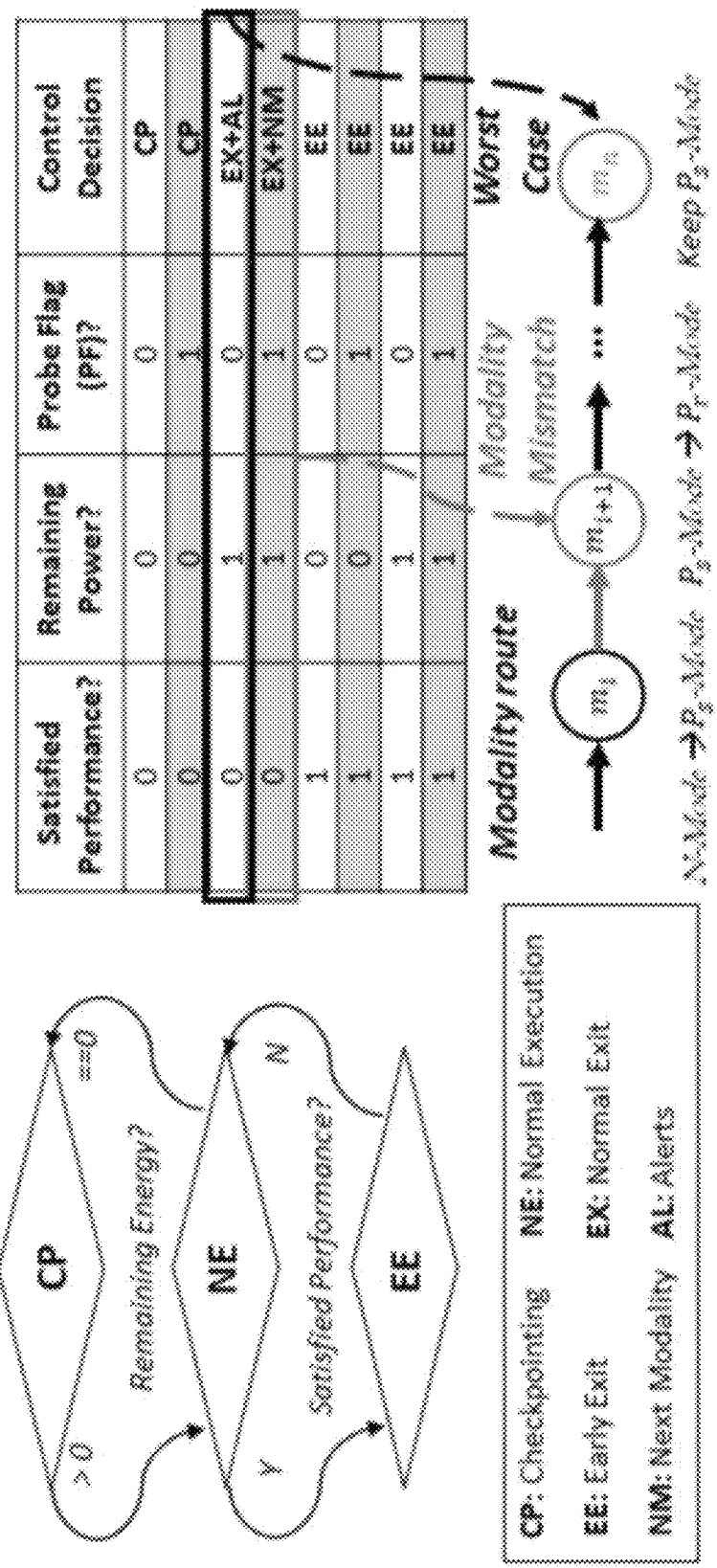
FIG. 9 is a diagram illustrating coordination state diagram for an inference task according to one embodiment of the present disclosure.

Overall, AMG processes multi-modal data stream based on the table shown in FIG. 9. It is determined by three parameters, namely, performance objective, remaining energy and the aforementioned probe flag. In the present embodiment, M²C task is deemed complete if its performance (accuracy and latency) requirement is met, without performing more computation as shown in FIG. 8. Before the performance is satisfied, data is processed based on energy availability. If there is inadequate energy, the system will use a checkpoint to save the execution state and awake the task until the accumulated energy passes a threshold. In the initialization phase, the sensor enters Ps-mode from N-mode and stays in Ps-mode unless modality mismatch occurs. As shown in the case (i.e. EX+NM) in FIG. 9, the modality mismatch occurs if the energy is adequate while the performance is not satisfied, and then the sensor switches from Ps-mode to Pr-mode.

The data of the next modality can be restored and computed by using the speculative activation scheme in the above portion.

TABLE I

| Dataset | Samples | Modality | M²C Application |
|---------|---------|----------|-----------------|
| Sarcasm | 690 | Language (BERT/GloVe), | Affective |
| cmumosi | 2,199 | Visual(ResNet), audio (Librosa) | Computing |
| mmimdb | 25,959 | Text(Glove); image(VGG) | Multimedia |
| Avmnist | 70,000 | Image (Raw), audio (Spectogram) | Computing |

TABLE II

| Type | Scheme | Description |
|------|--------|-------------|
| Uni-modal models | image | Using ResNet to process data from visual modality |
| | audio | Using the speech processing library Librosa |
| | text | Processing text modality with BERT/GloVe |
| SOTA | LF | Fusion by concatenation (Baseline) |

TABLE II-continued

| Type | Scheme | Description |
|---|---|---|
| M2C Model | TF | Fusion by tensor outer product |
| | LRTF | Fusion by a modality-specific factors |
| | MIM | Fusion by inter-modality communication |

To validate AMG, the MultiBench which contains a wide range of real-world applications can be used. The multimedia applications and affective computing applications from the MultiBench and 4 state-of-the-art (SOTA) multi-modal learning datasets as described in Table I are used. Table I illustrate the description of the used $M^2C$ tasks and datasets. These 4 datasets have a wide range of data samples from 690 to 70,000 samples. They cover the most common modalities such as language text, image, audio. Among them, the sarcasm (sa) is a video corpus used for discovering sarcasm. The cmumosi (mo) is a real-world multimodal dataset for affect recognition which is regularly used in competitions and workshops. The avmnist (av) is created by paring the audio of human reading digits from the FSDD dataset with written digits in the MNIST dataset. The mmimdb (mm) is the largest publicly available multimodal dataset for genre prediction on movies.

AMG of the present application can achieve similar even better performance, as shown in Table II. Table II illustrates SOTA $M^2C$ models for performance evaluation. AMG of the present embodiment is compared with both the uni-modal methods and the state-of-the-art multi-modal methods. In each of the uni-modal models (i.e., image, audio and text), the encoding network of one modality is used and is connected to the classification network to obtain the output predictions.

TABLE III

| Category | Scheme | Description |
|---|---|---|
| Computing Opti. Methods | CPU-First | Adjusting CPU frequency at first |
| | GPU-First | Adjusting GPU frequency at first |
| | CPU-GPU | Co-adjusting CPU and GPU frequency |
| | Quan | Using DNN quantization to manage energy |
| | Prune | Using DNN pruning to manage energy |
| | Qlearning | Using machine learning to tune different knobs |
| | OnlySen | Assuming no computing overheads (Ideal) |
| Sensing Opti. Methods | Rndm | Randomly decide modality order (Adaptive acc.) |
| | Grdy 1 | Completing current modality (Best modality order) |
| | Grdy 2 | Arriving at the final exit (Best modality order) |
| | AMG | Our method (Best modality order & adaptive Acc.) |

To show the superiority of AMG in optimizing the energy efficiency of $M^2C$, the AMG in the present embodiment is compared with two categories of works including 1) various current methods that mainly optimize the computing tasks and 2) derivatives of our design that optimize the sensing components as shown in Table III, which illustrates the evaluated power management schemes.

Figure 10:
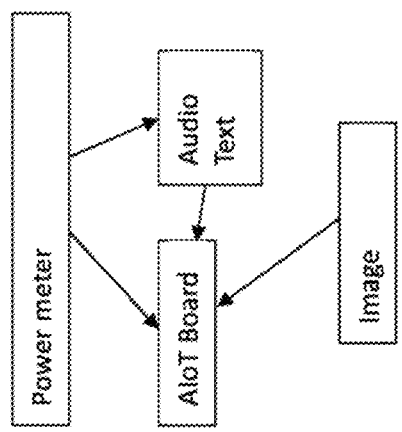
FIG. 10 is a schematic representation of an evaluated system according to one embodiment of the present disclosure.

A prototype bench of AMG as per the present embodiment of the present application is illustratively shown in FIG. 10, which is based on NVIDIA Jetson Nano. Different sensors can be added to the AIoT board for collecting various signals from image. Sony's IMX219-77 camera and a Waveshare's USB to Audio can be used to collect signals from the image and audio modalities, respectively. Power meter provides power to the AIoT board. For the text modality, the audio sensor is firstly used to collect the audio signal and the audio signal can be converted into a text signal. For each modality sensor, a 24 MB raw input buffer (can store 30 frames of 1080 P images) is enough for most modalities. The buffer can be implemented with an 8-bit per cell RRAM and a 10-bit ADC which is commonly used in current sensors. For most modalities, reading the entire buffer is not required due to the designed large size. Moreover, with the optimization of the speculation mechanism, the buffer's read latency does not affect the back-end multimodal DNN inference much.

Figure 11:
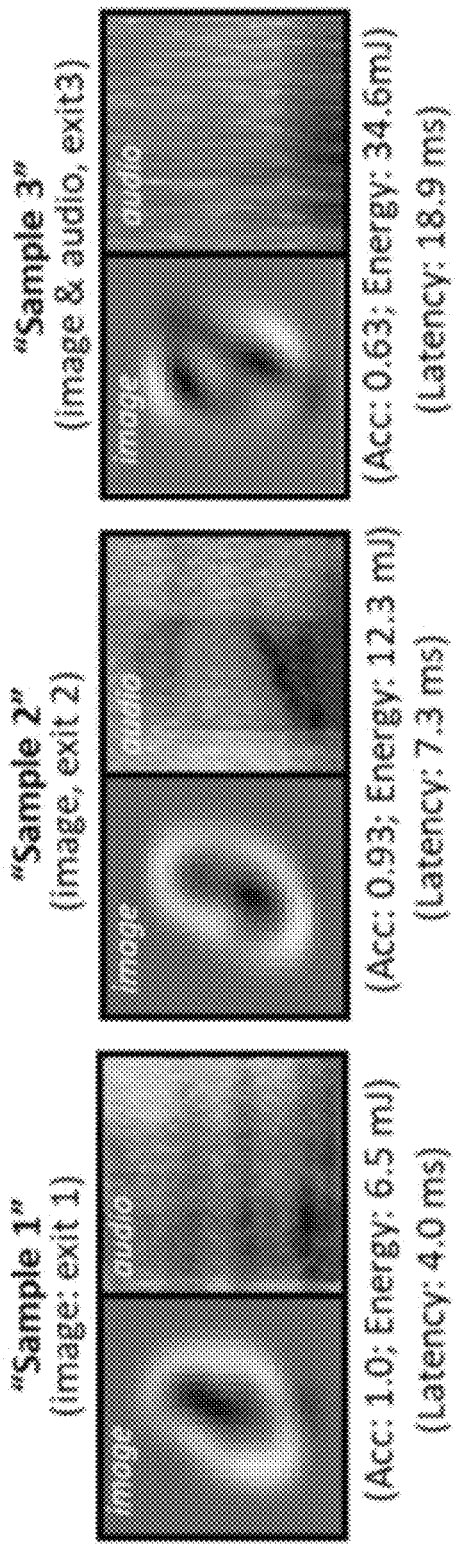
FIG. 11 is a demonstration of AMG when processing data samples of different difficulty from the avmnist dataset.

FIG. 11 shows the results for the avmnist dataset which classifies data samples based on two modalities including image and audio according to the AMG of the present embodiment.

The data samples of image are represented in pixels, and the data samples of audio are represented with a 112×112 spectrogram. It can be seen that both Samples 1 & 2 can be classified accurately by exiting from image modality. However, for Sample 3, AMG has to complete both image and audio modalities to compute the final prediction. The results indicate that Sample 3 is more complex than Sample 1 & 2, thus requiring a fusion of modalities. AMG can predict results for different data samples with optimal computational efforts.

Figure 12:
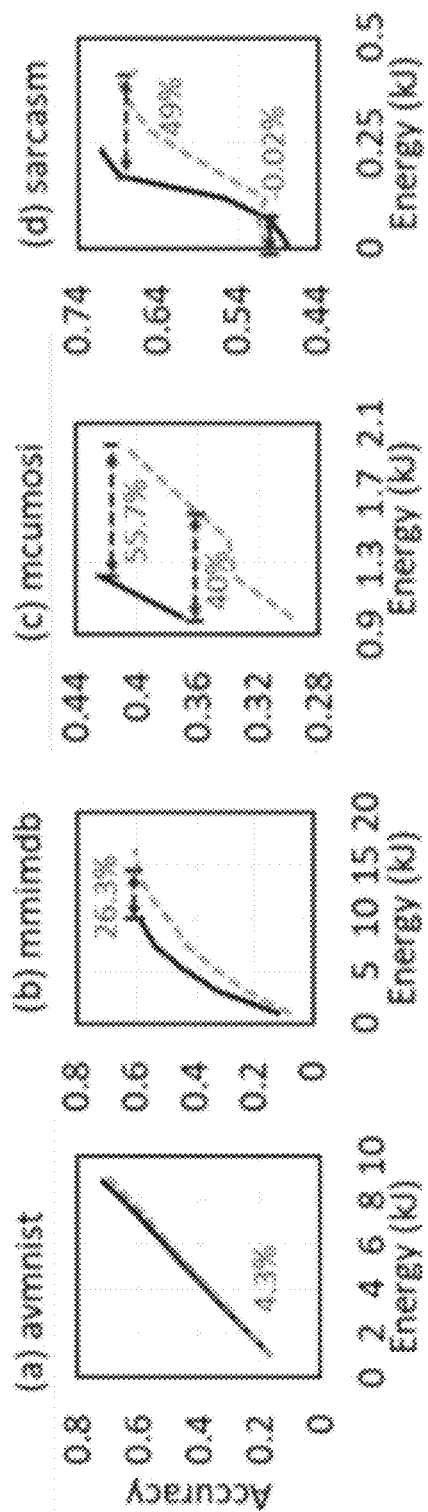
FIG. 12 is a diagram illustrating energy efficiency of multi-exit execution path.

Validation of sensor semi-gating mechanism is illustrated as follows. The effectiveness of the sensor semi-gating mechanism can be evaluated by comparing the energy efficiency of the computing process for different $M^2C$ applications with/without gating. As shown in FIG. 12, the solid line represents the energy efficiency with gating while the dotted line indicates the results without gating. According to the results, AMG's sensor semi-gating can slash up to 55% more energy with the same accuracy.

Figures 13A, 13B:
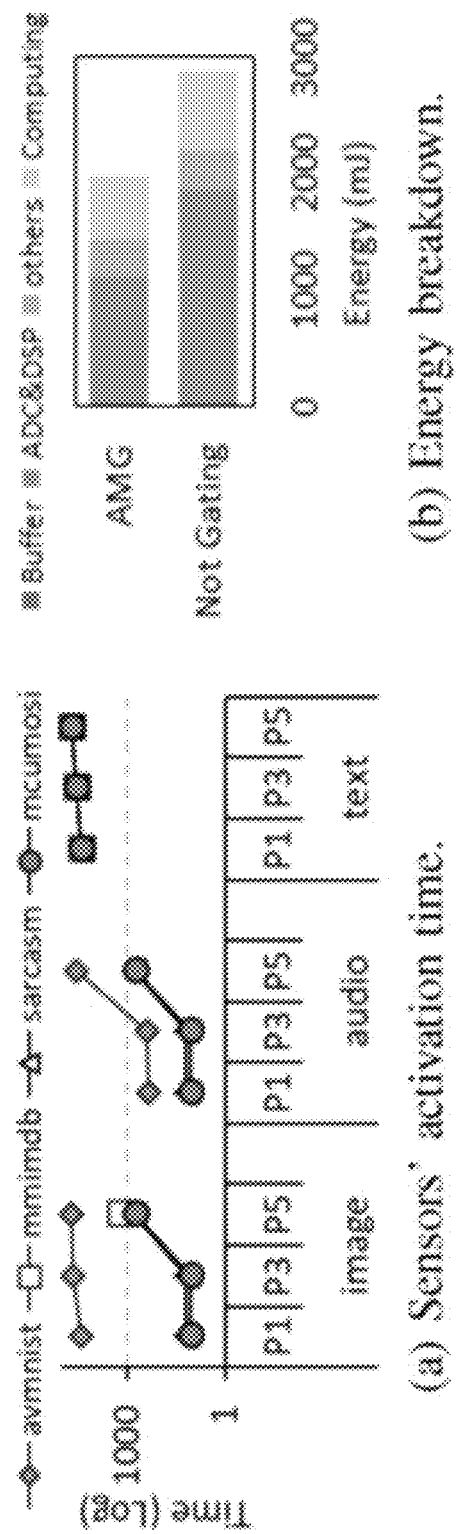
FIG. 13a and FIG. 13b show sensor gating reduces the sensor energy by 40.9% and the inference energy by 19% for a $M^2C$ cmumosi task, respectively, according to one embodiment of the present disclosure.

Besides, AMG can reduce the sensing energy waste from sensors for simple, common data samples. As shown in FIG. 13a, the operation time of different sensors completing the entire sensing pipeline (i.e., in N-Mode or Pr-Mode) under large (P3), medium (P2), and small (P1) capacity of the battery is illustrated. The activation time percentage when the device should open is 0.14%, 0.14% and 43.31% respectively for image, audio and text under cmumosi. In FIG. 13b, it shows that sensor gating reduces the ADC and DSP energy by 40.9% and the inference energy by 19% while the write/read energy overhead of the raw data buffer is 0.062 mJ.

Figure 14:
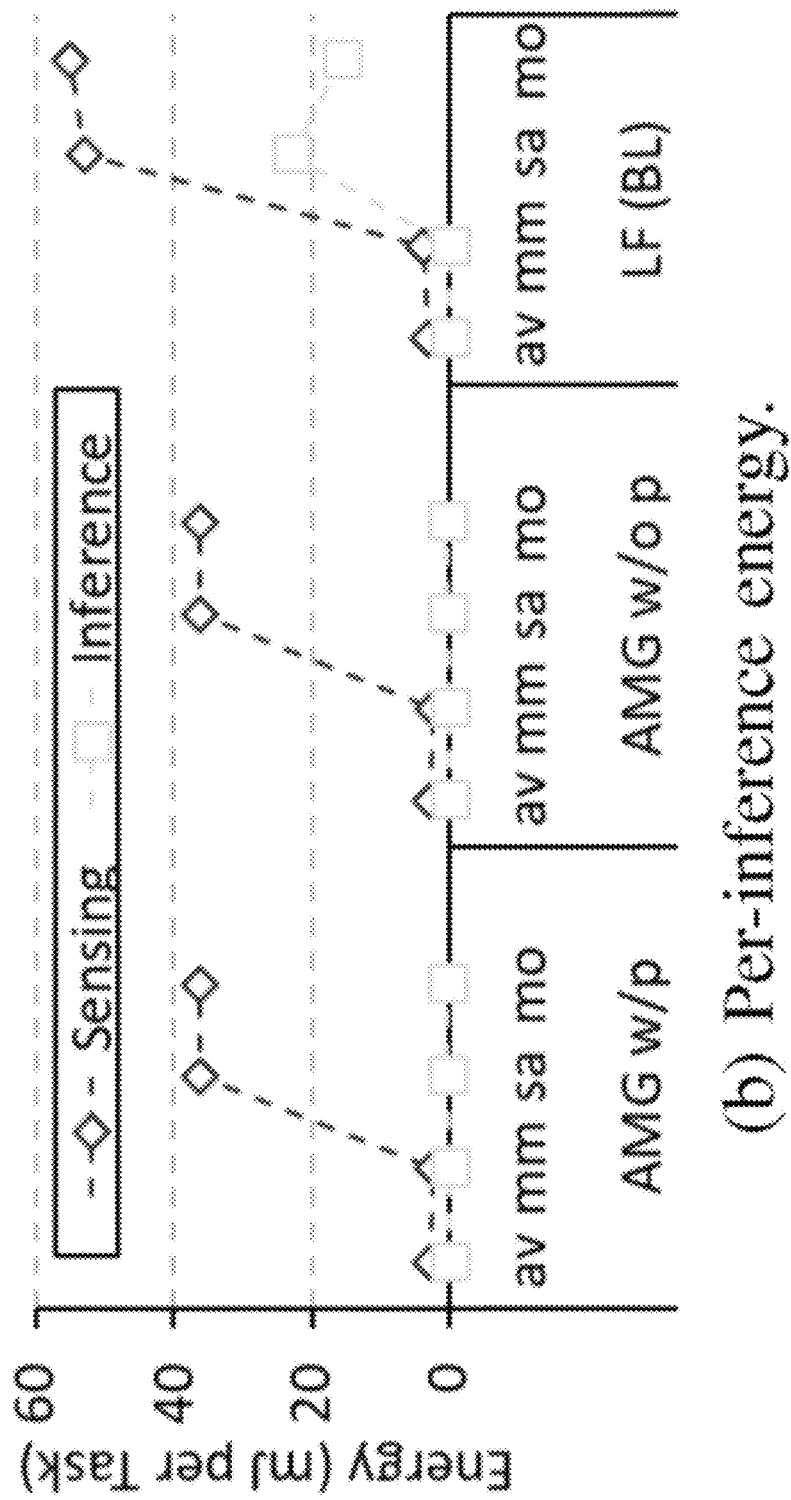
FIG. 14 shows that AMG achieves the same or even better accuracy than traditional $M^2C$ methods, while having a little tail latency.
Figure 14:
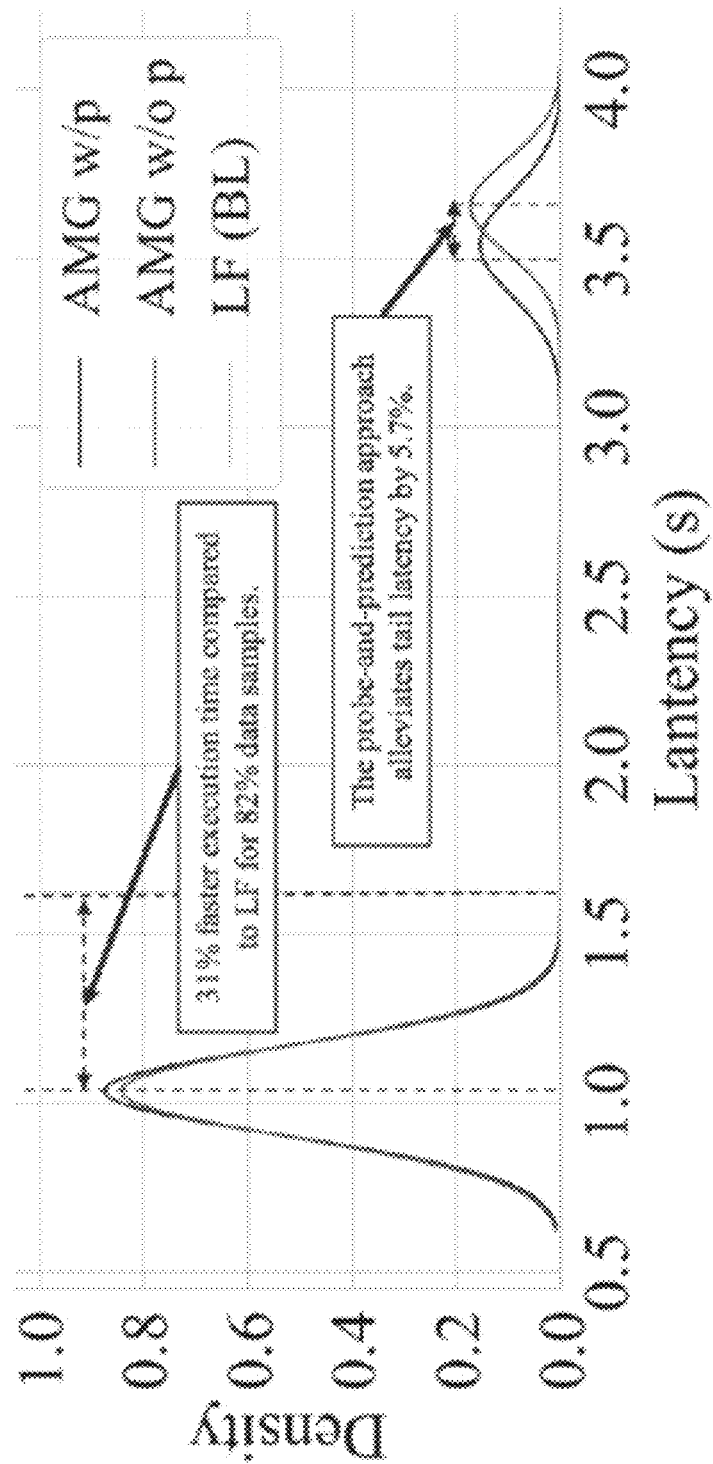

As shown in FIG. 14, AMG can achieve the same and even higher accuracy compared to LF with less energy for each inference. AMG can significantly reduce the execution time for over 80% data samples by about 1 second.

Figure 15:
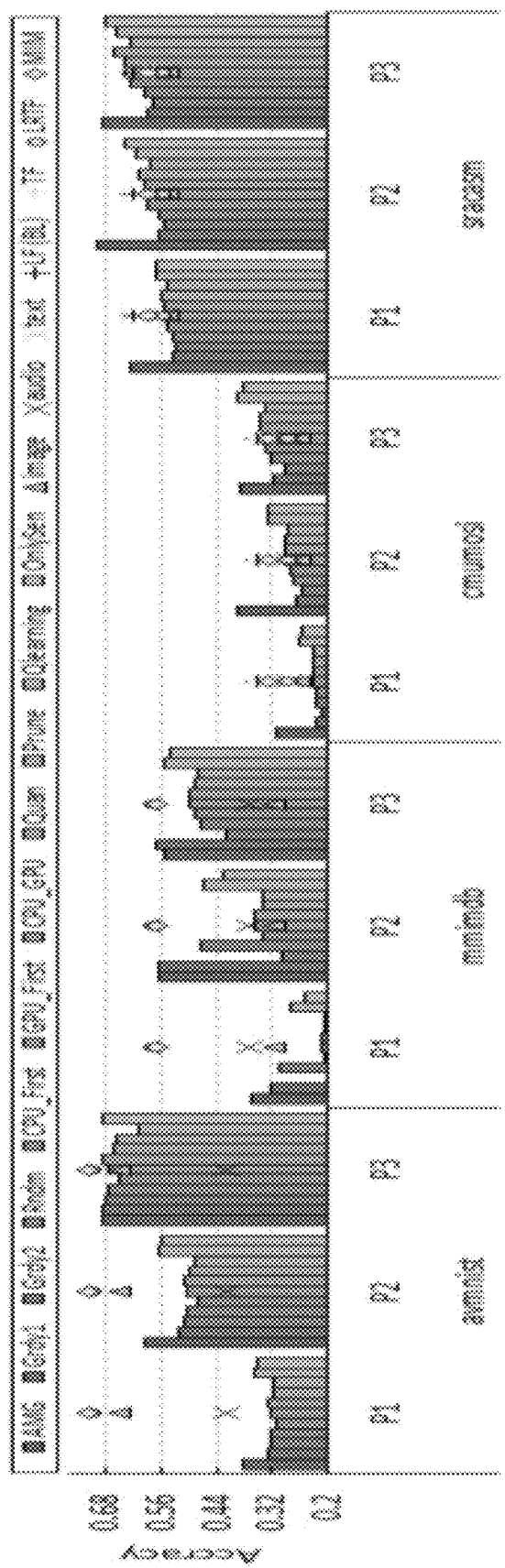
FIG. 15 shows an accuracy comparison of AMG with the SOTA energy-efficient method between the prior art and one embodiment of the present disclosure.

In FIG. 15, the accuracy of different datasets under different power management (PM) methods is shown. AMG achieves the best accuracy among all the PM methods. It is because it can effectively balance multi-modal information with multi-exit co-training, and plays a certain regularization effect through multi-modal and unimodal co-feature extraction, which trains a better model under the same architecture as LF.

Figure 16B:
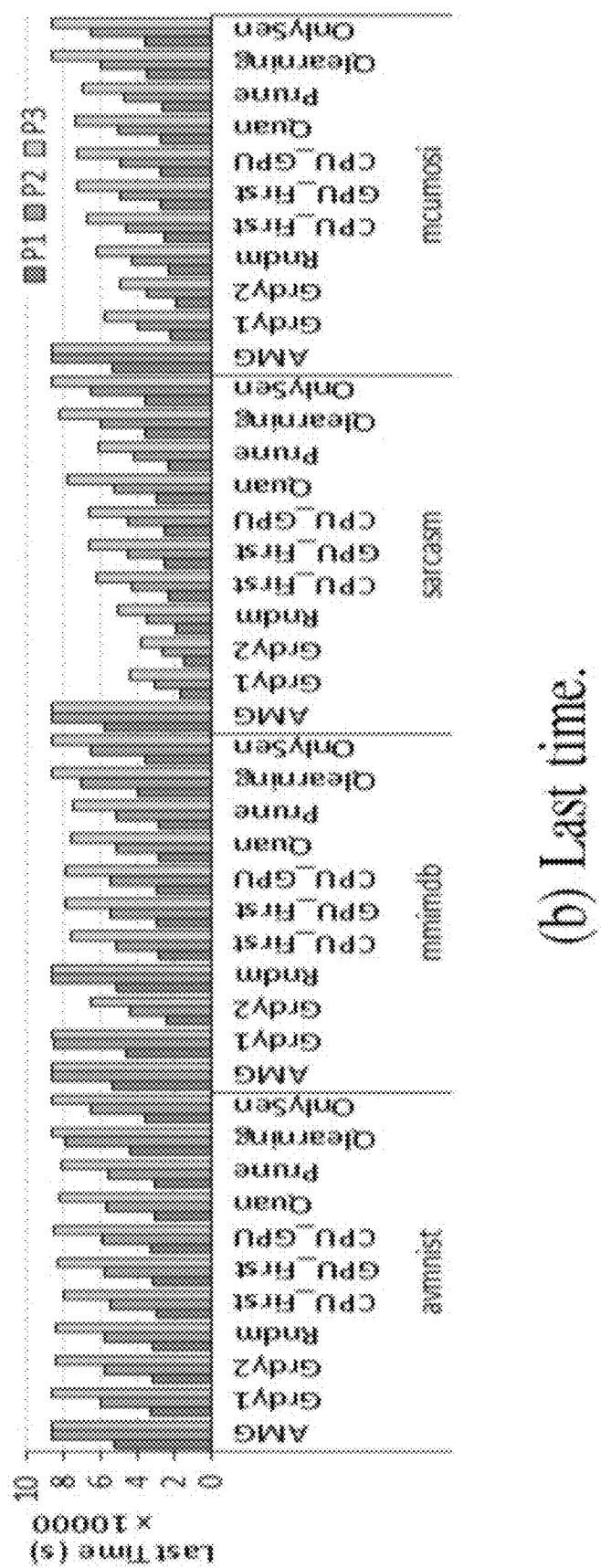

As shown in FIG. 16a, AMG can accomplish much more inference tasks compared to the other methods with the same energy budget. For example, AMG can complete 1.6×~1.8× avmnist tasks and 1.8×~3.8× sarcasm tasks. One of the main reasons why AMG can complete more tasks is that it reduces the waste energy of sensors for most data samples. As shown in FIG. 16b, the energy usage time of AMG is longer than the others due to its adaptive modality sensing and computing control and the system can accomplish more tasks without losing much accuracy. In detail, AMG can execute 10%~280% more time with the same energy budget.

Figure 17A:
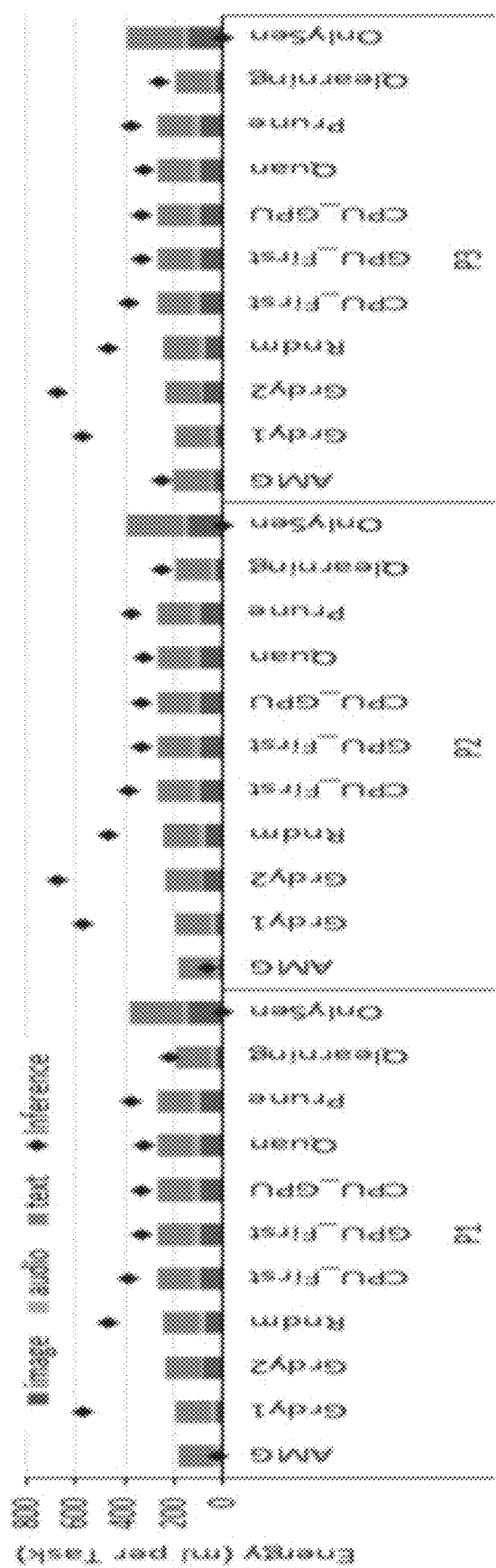
FIG. 17a and FIG. 17b respectively show energy consumption and system last time of different $M^2C$ tasks under different energy-efficient approaches between the prior art and one embodiment of the present disclosure.
Figure 17B:
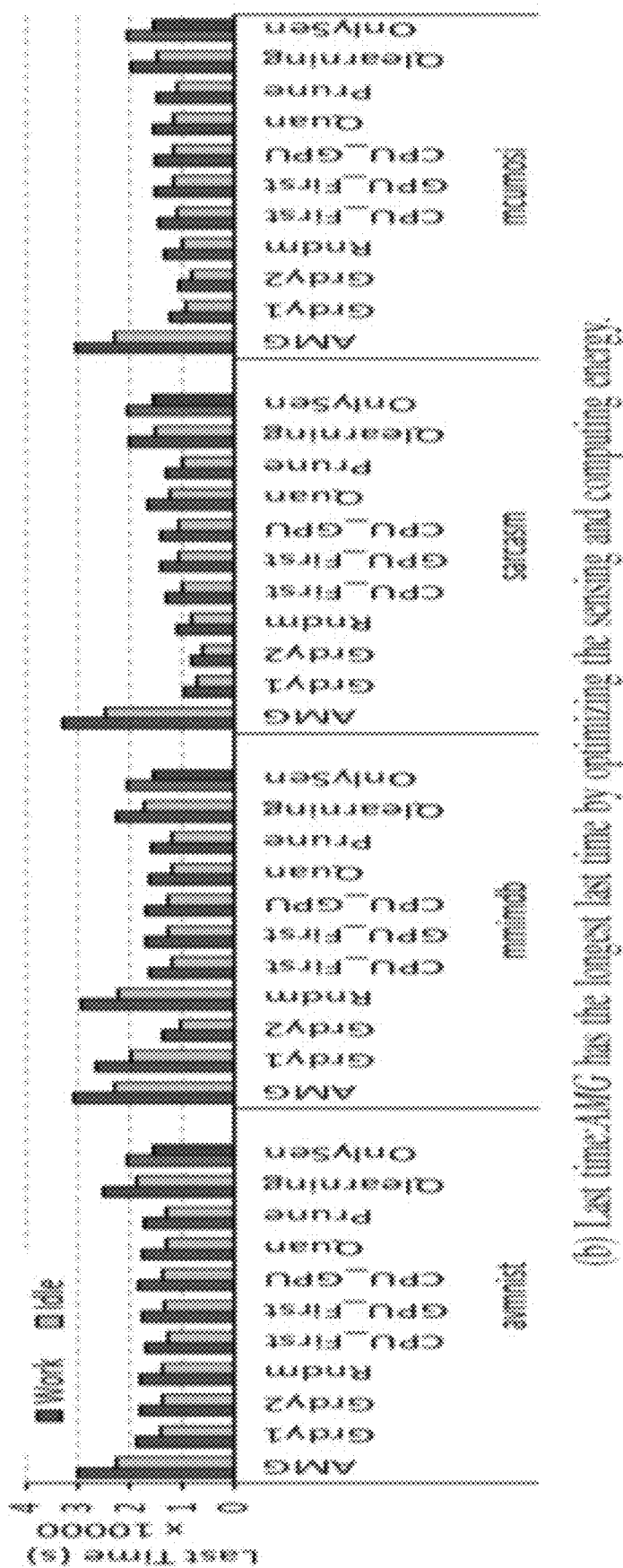

FIG. 17a shows AMG significantly reduces both the sensing and computing energy of the $M^2C$, i.e., LF. As shown in FIG. 17b, the SOTA PM schemes are too blind and thus waste much energy. This further runs out of the energy budgets and leads to shorter last time. Overall, AMG is able to employ less power consumption while guaranteeing very high performance due to its ability to efficiently activate the modalities and early exit mechanisms.

The present disclosure implements efficient multi-modal computing for handling various sensory modalities, by introducing an adaptive modality gating (AMG). The present disclosure can greatly slash $M^2C$ overhead while maintaining high performance. It can greatly contribute to the wide adoption of multi-modal computing on various AIoT devices and edge micro/nano data centers, thereby benefiting numerous real-life smart applications. In the present disclosure, AMG improves the AIoT lifespan by 74.5% to 133.7% with the same energy budget while meeting all the accuracy and latency requirements Further, the present disclosure improves the efficiency of existing $M^2C$ applications running in AIoT environments. AMG is orthogonal to most of the existing power optimization methods. It would be easy to integrate them with AMG to achieve better energy optimization. The present disclosure further provides applying the early exit approach to multi-modal analysis.

The embodiments or elements showcased within this disclosure, including the specific illustrations and materials utilized in examples, are intended to be illustrative, not restrictive. They allow for a wide range of alterations, adjustments, or adaptations that align with the fundamental concept of the present disclosure. It's important to clarify that all depicted diagrams are solely for illustrative purposes; they are neither to scale nor are they precise reproductions of actual devices.

Wherever not already described explicitly, individual embodiments, or their individual aspects and features, described in relation to the drawings can be combined or exchanged with one another without limiting or widening the scope of the described disclosure, whenever such a combination or exchange is meaningful and in the sense of this disclosure. Advantages which are described with respect to a particular embodiment of present disclosure or with respect to a particular figure are, wherever applicable, also advantages of other embodiments of the present disclosure.

REFERENCES

[1] S. I. 219, "Diagonal 4.60 mm (type 1/4.0) 8 m pixel cmos image sensor with square pixel for color cameras, wwwelectronicsdatasheets.com/download/5721ed8ce34e24fd697a913a.pdf, 2022.

[2] M. Akhtar, D. Chauhan, D. Ghosal, S. Poria, A. Ekbal, and P. Bhattacharyya, "Multi-task learning for multimodal emotion recognition and sentiment analysis," in Association for Computational Linguistics (ACL), 2019.

[3] D. Amodei, S. Ananthanarayanan, R. Anubhai, J. Bai, E. Battenberg, C. Case, J. Casper, B. Catanzaro, Q. Cheng, G. Chen et al., "Deep speech 2: End-to-end speech recognition in english and mandarin," in International Conference on Machine Learning (ICML), 2016.

[4] J. Arevalo, T. Solorio, M. Montes-y Gomez, and F. Gonzalez, "Gated multimodal units for information fusion," in International Conference on Learning Representations (ICLR), 2017.

[5] ARM, "Mrs (system coprocessor register to arm register)," developer.arm.com/documentation/dui0473/j/arm-and-thumbinstructions/mrs-system-coprocessor-register-to-arm-register-, 2022.

[6] F. Bach, G. Lanckriet, and M. Jordan, "Multiple kernel learning, conic duality, and the smo algorithm," in International Conference on Machine Learning (ICML), 2004.

[7] T. Baltrušaitis, C. Ahuja, and L. Morency, "Multimodal machine learning: A survey and taxonomy," in IEEE Transactions on Pattern Analysis and Machine Intelligence (PAMI), 2018.

[8] W. Banerjee, "Challenges and applications of emerging nonvolatile memory devices," Electronics, 2020.

[9] S. Bertolazzi, W. Coon, M. Howard, I. Donaldson, E. Jolivet, and S. Kumar, "Status of the memory industry: Market and technology report 2020," www.i-micronews.com/products/emerging-non-volatilememory-2020, 2020.

[10] Canaan, "Kendryte k210 datasheet," tinyurl.com/354tzz4t, 2019.

[11] S. Castro, D. Hazarika, V. Perez-Rosas, R. Zimmermann, R. Mihalcea, and S. Poria, "Towards multimodal sarcasm detection (an _obviously_perfect paper)," in Association for Computational Linguistics (ACL), 2019.

[12] O. Celiktutan, E. Skordos, and H. Gunes, "Multimodal human-humanrobot interactions (mhhri) dataset for studying personality and engagement," IEEE Transactions on Affective Computing (TAC), 2019.

[13] I. Cevik, X. Huang, H. Yu, M. Yan, and S. U. Ay, "An ultra-low power cmos image sensor with on-chip energy harvesting and power management capability," Sensors, 2015.

[14] A. Chen, "A review of emerging non-volatile memory (nvm) technologies and applications," Solid-state Electronics, 2016.

[15] C. T. Chiang, C. H. Wang, and C. Y. Wu, "A cmos mems audio transducer implemented by silicon condenser microphone with analog front-end circuits of audio codec," IEEE Transactions on Very Large Scale Integration (VLSI) Systems, 2012.

[16] CYMBET, "Rechargeable solid state bare die batteries," in EnerChip™ Bare Die CBC005 Datasheet, 2016.

[17] J. Devlin, M. Chang, K. Lee, and K. Toutanova, "Bert: Pre-training of deep bidirectional transformers for language understanding," in Conference of the North American Chapter of the Association for Computational Linguistics (NAACL), 2019.

[18] X. Dong, C. Xu, Y. Xie, and N. P. Jouppi, "Nvsim: A circuit-level performance, energy, and area model for emerging nonvolatile memory," IEEE Transactions on Computer-Aided Design of Integrated Circuits and Systems (TCAD), 2012.

[19] S. Expo and Conference, "Low power microphone acquisition and processing for always-on applications based on microcontrollers," hobbydocbox.com/Radio/80585828-Low-power-microphoneacquisition-and-processing-for-always-on-applications-based-onmicrocontrollers.html, 2017.

[20] A. E. Gamal and H. Eltoukhy, "Cmos image sensors: An introduction to the technology, design and performance limits, presenting recent developments and future directions," IEEE Circuits and Devices Magazine, 2005.

[21] Google, "Edge tpu—ai at the edge," cloud.google.com/edge-tpu, 2021.

[22] J. Guerreiro, A. Ilic, N. Roma, and P. Tomas, "Modeling and decoupling the gpu power consumption for cross-

[23] Y. Han, G. Huang, S. Song, L. Yang, H. Wang, and Y. Wang, "Dynamic neural networks: A survey," in IEEE Transactions on Pattern Analysis and Machine Intelligence (PAMI), 2021.

[24] K. He, X. Zhang, S. Ren, and J. Sun, "Deep residual learning for image recognition," in Conference on Computer Vision and Pattern Recognition (CVPR), 2016.

[25] Y. He, J. Lin, Z. Liu, H. Wang, L. Li, and S. Han, "Amc: Automl for model compression and acceleration on mobile devices," in European Conference on Computer Vision (ECCV), 2018.

[26] J. Helgath, P. Braun, A. Pritschet, M. Schubert, P. Bohm, and D. Isemann, "Investigating the effect of different autonomy levels on user acceptance and user experience in self-driving cars with a vr driving simulator," Interaccion, 2018.

[27] X. Hou, L. Hao, C. Li, Q. Chen, W. Zheng, and M. Guo, "Power grab in aggressively provisioned data centers: What is the risk and what can be done about it," International Conference on Computer Design (ICCD), 2018.

[28] X. Hou, C. Li, J. Liu, L. Zhang, Y. Hu, and M. Guo, "Ant-man: towards agile power management in the microservice era," in International Conference for High Performance Computing, Networking, Storage, and Analysis (SC), 2020.

[29] X. Hou, C. Li, J. Liu, L. Zhang, S. Ren, J. Leng, Q. Chen, and M. Guo, "Alphar: Learning-powered resource management for irregular, dynamic microservice graph," IEEE International Parallel and Distributed Processing Symposium (IPDPS), 2021.

[30] X. Hou, M. Liang, C. Li, W. Zheng, Q. Chen, and M. Guo, "When power oversubscription meets traffic flood attack: Re-thinking data center peak load management," International Conference on Parallel Processing (ICPP), 2019.

[31] X. Hou, C. Xu, J. Liu, X. Tang, L. Sun, C. Li, and K. T. Cheng, "Characterizing and understanding end-to-end multi-modal neural networks on gpus," IEEE Computer Architecture Letters (CAL), 2022.

[32] Z. Huang, F. Dong, D. Shen, J. Zhang, H. Wang, G. Cai, and Q. He, "Enabling low latency edge intelligence based on multi-exit dnns in the wild," in International Conference on Distributed Computing Systems (ICDCS), 2021.

[33] P. N. Inc., "Optimize your optimization: An open-source hyperparameter optimization framework to automate hyperparameter search," optuna.org/, 2022.

[34] H. Incorporation, "Huawei gt 2 smartwatch," consumer.huawei.com/en/wearables/watch-gt2/, 2019.

[35] S. Jayakumar, W. Czarnecki, J. Menick, J. Schwarz, J. Rae, S. Osindero, Y. Teh, T. Harley, and R. Pascanu, "Multiplicative interactions and where to find them," in International Conference on Learning Representations (ICLR), 2020.

[36] K. Kaviani, O. Oralkan, B. T. Khuri-Yakub, and B. A. Wooley, "A multichannel pipeline analog-to-digital converter for an integrated 3-d ultrasound imaging system," IEEE J. Solid State Circuits (JSSCC), 2003.

[37] Y. Kaya, S. Hong, and T. Dumitras, "Shallow-deep networks: Understanding and mitigating network overthinking," in International Conference on Machine Learning (ICML), 2019.

[38] H. Kim, H. Oh, and J. Kim, "Energy-efficient xnor-free in-memory bnn accelerator with input distribution regularization," in IEEE/ACM International Conference On Computer Aided Design (ICCAD), 2020.

[39] S. Kim, K. Bin, S. Ha, K. Lee, and S. Chong, "ztt: learning-based dvfs with zero thermal throttling for mobile devices," in International Conference on Mobile Systems, Applications, and Services (MobiSys), 2021.

[40] W. Kim, M. Gupta, G. Wei, and D. Brooks, "System level analysis of fast, per-core dvfs using on-chip switching regulators," in International Symposium on High Performance Computer Architecture (HPCA), 2008.

[41] S. Krishnan, Z. Wan, K. Bhardwaj, P. N. Whatmough, A. Faust, S. M. Neuman, G. Y. Wei, D. M. Brooks, and V. J. Reddi, "Automatic domain-specific soc design for autonomous unmanned aerial vehicles," International Symposium on Microarchitecture (MICRO), 2022.

[42] M. Lanza, A. Sebastian, W. D. Lu, M. L. Gallo, M. F. Chang, D. Akinwande, F. M. Puglisi, H. N. Alshareef, M. Liu, and J. B. Roldan, "Memristive technologies for data storage, computation, encryption, and radio-frequency communication," Science, 2022.

[43] S. Laskaridis, A. Kouris, and N. Lane, "Adaptive inference through earlyexit networks: Design, challenges and directions," in Proceedings of the 5th International Workshop on Embedded and Mobile Deep Learning (EMDL), 2021.

[44] E. Lecarpentier and E. Rachelson, "Non-stationary markov decision processes a worst-case approach using model-based reinforcement learning," in Conference on Neural Information Processing Systems (NeurIPS), 2019.

[45] C. Li, Z. Wang, X. Hou, H. peng Chen, X. Liang, and M. Guo, "Power attack defense: Securing battery-backed data centers," International Symposium on Computer Architecture (ISCA), 2016.

[46] D. Li, X. Qian, R. Li, C. Fei, L. Jiang, X. Chen, Y. Yang, and Q. Zhou, "High resolution adc for ultrasound color doppler imaging based on mash sigma-delta modulator," IEEE Transactions on Biomedical Engineering (TBE), 2020.

[47] P. Liang, Y. Lyu, X. Fan, Z. Wu, Y. Cheng, J. Wu, L. Chen, P. Wu, M. Lee, and Y. Zhu, "Multibench: Multiscale benchmarks for multimodal representation learning," in Conference on Neural Information Processing Systems (NeurIPS), 2021.

[48] R. Likamwa, B. Priyantha, M. Philipose, L. Zhong, and P. Bahl, "Energy characterization and optimization of image sensing toward continuous mobile vision," International Conference on Mobile Systems, Applications, and Services (MobiSys), 2013.

[49] Z. Liu, Y. Shen, B. Lakshminarasimhan, P. Liang, A. Zadeh, and L. Morency, "Efficient low-rank multimodal fusion with modality-specific factors," in Association for Computational Linguistics (ACL), 2018.

[50] B. McFee, C. Raffel, D. Liang, D. Ellis, M. McVicar, E. Battenberg, and O. Nieto, "librosa: Audio and music signal analysis in python," 2015.

[51] N. Natalia, W. Christian, W. Graham, and N. Florian, "Multi-scale deep learning for gesture detection and localization," in European Conference on Computer Vision (ECCV), 2014.

[52] Nvidia, "Nvidia jetson nano developer kit," developer.nvidia.com/zh-cn/embedded/learn/get-started-jetson-nano-devkit, 2020.

[53] H. Ono and K. Mizoi, "Wireless transmitting and receiving systems including ear microphones," Journal of the Acoustical Society of America, 1983.

[54] R. Panda, C. F. Chen, Q. Fan, X. Sun, K. Saenko, A. Oliva, and R. S. Feris, "Adamml: Adaptive multi-modal learning for efficient video recognition," International Conference on Computer Vision (ICCV), 2021.

[55] A. Parashar, P. Raina, Y. S. Shao, Y. hsin Chen, V. A. Ying, A. Mukkara, R. Venkatesan, B. Khailany, S. W. Keckler, and J. S. Emer, "Timeloop: A systematic approach to dnn accelerator evaluation," International Symposium on Performance Analysis of Systems and Software (ISPASS), 2019.

[56] E. Park, D. Kim, and S. Yoo, "Energy-efficient neural network accelerator based on outlier-aware low-precision computation," in International Symposium on Computer Architecture (ISCA), 2018.

[57] J. Pennington, R. Socher, and C. Manning, "Glove: Global vectors for word representation," in Empirical Methods in Natural Language Processing (EMNLP), 2014.

[58] H. Pham, P. Liang, T. Manzini, L. Morency, and B. Poczos, "Found in translation: Learning robust joint representations by cyclic translations between modalities," in AAAI Conference on Artificial Intelligence (AAAI), 2019.

[59] M. Rastegari, V. Ordonez, J. Redmon, and A. Farhadi, "Xnor-net: Imagenet classification using binary convolutional neural networks," in European Conference on Computer Vision (ECCV), 2016.

[60] D. Roy, Y. Li, T. Jian, P. Tian, K. R. Chowdhury, and S. Ioannidis, "Multi-modality sensing and data fusion for multi-vehicle detection," IEEE Transactions on Multimedia (ToM), 2022.

[61] M. Sandler, A. Howard, M. Zhu, A. Zhmoginov, and L. C. Chen, "Mobilenetv2: Inverted residuals and linear bottlenecks," in Conference on Computer Vision and Pattern Recognition (CVPR), 2018.

[62] S. Scardapane, M. Scarpiniti, E. Baccarelli, and A. Uncini, "Why should we add early exits to neural networks?" in Cognitive Computation, 2020.

[63] M. A. Shafique, T. Theocharides, V. J. Reddi, and B. Murmann, "Tinyml: Current progress, research challenges, and future roadmap," Design Automation Conference (DAC), 2021.

[64] Sipeed, "Sipeed maix-ii dock (v831)," www.seeedstudio.com/Sipeed-MAIX-Dock-p-4815.html.

[65] S. Sun, J. Wang, M. Zhang, Y. Ning, D. Ma, Y. Yuan, P. Niu, Z. Rong, Z. Wang, and W. Pang, "Mems ultrasonic transducers for safe, low-power and portable eye-blinking monitoring," Microsystems & Nanoengineering, 2022.

[66] H. Tabkhi and G. Schirner, "Application-guided power gating reducing register file static power," in IEEE Transactions on Very Large Scale Integration Systems (VLSI), 2014.

[67] S. Teerapittayanon, B. McDanel, and H. Kung, "Branchynet: Fast inference via early exiting from deep neural networks," in International Conference on Pattern Recognition (ICPR), 2016.

[68] Texas, "Mixed signal microcontroller," in MSP430G2x11 MSP430G2x01 Datasheet, 2013.

[69] M. Urbina, T. Acosta, J. Lazaro, A. Astarloa, and U. Bidarte, "Smart sensor: Soc architecture for the industrial internet of things," in IEEE Internet of Things Journal (IoTJ), 2019.

[70] O. Vinyals, A. Toshev, S. Bengio, and D. Erhan, "Show and tell: Lessons learned from the 2015 mscoco image captioning challenge," in IEEE Transactions on Pattern Analysis and Machine Intelligence (PAMI), 2016.

[71] K. Wang, Z. Liu, Y. Lin, J. Lin, and S. Han, "Haq: Hardware aware automated quantization with mixed precision," in Conference on Computer Vision and Pattern Recognition (CVPR), 2019.

[72] W. Wang, D. Tran, and M. Feiszli, "What makes training multi-modal classification networks hard?" in Conference on Computer Vision and Pattern Recognition (CVPR), 2020.

[73] K. Wu, IngLin, Y. Wang, and S. Yang, "Bti-aware sleep transistor sizing algorithm for reliable power gating designs," in IEEE Transactions on Computer-Aided Design of Integrated Circuits and Systems (TCAD), 2014.

[74] Y. Wu, Z. Wang, Z. Jia, Y. Shi, and J. Hu, "Intermittent inference with nonuniformly compressed multi-exit neural network for energy harvesting powered devices," in ACM/IEEE Design Automation Conference (DAC), 2020.

[75] Y. Wu, E. Chang, K. Chang, and J. Smith, "Optimal multimodal fusion for multimedia data analysis," in ACM International Conference on Multimedia (ACM MM), 2004.

[76] Z. Xiaoli and B. Bir, "Feature fusion of side face and gait for video-based human identification," in Pattern Recognition, 2008.

[77] S. Yin, Z. Jiang, M. Kim, T. Gupta, M. Seok, and J. Seo, "Vesti: Energy efficient in-memory computing accelerator for deep neural networks," in IEEE Transactions on Very Large Scale Integration Systems (VLSI), 2020.

[78] B. Yu, W. Hu, L. Xu, J. Tang, S. Liu, and Y. Zhu, "Building the computing system for autonomous micromobility vehicles: Design constraints and architectural optimizations," International Symposium on Microarchitecture (MICRO), 2020.

[79] A. Zadeh, M. Chen, S. Poria, E. Cambria, and L. Morency, "Tensor fusion network for multimodal sentiment analysis," in Association for Computational Linguistics (ACL), 2017.

[80] C. Zhang, Z. Yang, X. He, and L. Deng, "Multimodal intelligence: Representation learning, information fusion, and applications," in IEEE Journal of Selected Topics in Signal Processing, 2020.

[81] Y. Zhang, C. H. Chen, T. He, and G. C. Temes, "A continuous-time deltasigma modulator for biomedical ultrasound beamformer using digital eld compensation and fir feedback," IEEE Transactions on Circuits and Systems (TCS), 2015.

What is claimed is:

1. A sensor system, the sensor system comprising:
a sensor array for generating an analog signal, the sensor array including a plurality of sensors;
an amplifier coupled to the sensor array, the amplifier being configured to amplify the analog signal received from the sensor array;
a buffer in communication with the amplifier, the buffer including a non-volatile memory array, the buffer being configured to receive the amplified analog signal from the amplifier and cache the amplified analog signal in the non-volatile memory array;
an analog-to-digital converter coupled to the amplifier and the buffer, and
a signal selector configured to control delivery of the amplified analog signal from the amplifier;
wherein, in a normal execution mode, the signal selector is configured to transmit the amplified analog signal from the amplifier to the analog-to-digital converter; in a mode of storing the analog signal in a power semi-gating mode, the signal selector is configured to transmit the amplified analog signal from the amplifier to the buffer for processing and storage; in a mode of recovering the analog signal in the power semi-gating mode, the signal selector is configured to process the analog signal from the buffer and transmit the processed analog signal to the analog-to-digital converter.

2. The sensor system according to claim 1, wherein the buffer includes a buffer array, and wherein in the mode of storing analog signals in the power semi-gating mode, the signal sensor is configured to generate multiple voltage levels according to the signal sent to the buffer and to convert the multiple voltage levels into different resistance values for storage.

3. The sensor system according to claim 2, wherein, in the mode of recovering the analog signal in the power semi-gating mode, the signal selector is configured to apply a readout voltage in the buffer array so as to convert previously stored resistance values into a current signal, and transmit the current signal to the analog-to-digital converter.

4. The sensor system according to claim 1, further comprising a digital signal processor, the digital signal processor being configured to process a current signal from the analog-to-digital sensor and transmit the processed current signal to the AIoT processor.

5. The sensor system according to claim 1, wherein the buffer comprises a 1-bit gate signal register, and the 1-bit gate signal register is configured to control the sensor system to switch between normal execution mode and power semi-gating mode, wherein if the value in the 1-bit gate signal register is 0, it means that the sensor system operates in the normal execution mode, and if the value in the 1-bit gate signal register is 1, it means that the sensor system operates in the power semi-gating mode.

6. The sensor system according to claim 5, wherein the buffer includes a buffer address register, and wherein when the sensor system operates in the power semi-gating mode, the buffer address register is used to determine where to store and restore analog signals.

7. The sensor system according to claim 6, wherein a number of sensors in the sensor system is same as a number of buffer address registers.

8. The sensor system according to claim 1, wherein the buffer further comprises a gate signal register and an address register, for providing a control interface for upper-layer applications.

9. The sensor system according to claim 1, wherein the signal selector circuit is a 1-to-2 inverse multiplexing signal selector circuit.

10. The sensor system according to claim 1, wherein the signal selector comprises a detection and prediction controller, the detection and prediction controller being configured to determine whether the sensor system is in the normal execution mode or in the power semi-gating mode according to a predetermined modality list that stores optimal orders of modalities for different $M^2C$ tasks and according to a current performance of and a remaining power budget of the $M^2C$ task.

11. The sensor system according to claim 10, wherein in initialization phase, the sensor system enters Ps-mode from N-mode and stays in Ps-mode unless modality mismatch occurs, wherein N-mode refers to normal execution mode, Ps-mode refers to storing mode of the power semi-gating mode.

12. The sensor system according to claim 11, wherein if the energy is adequate while the performance is not satisfied, the modality mismatch occurs and then the sensor switches from Ps-mode to Pr-mode, Pr-mode refers to restoring raw data mode.

13. The sensor system according to claim 10, wherein the optimal orders of modalities are determined by constructing a permutation tree covering all possible execution orders of the modalities, selecting the most probable execution sequence for each data input and obtaining the execution order with the most votes.

14. The sensor system according to claim 13, wherein the ordering process of the execution comprises using an evaluator based on MultiBench with the extension of an energy model, each data sample of the training dataset of energy model representing an $M^2C$ task, denoted by <Dn,Un>, where Dn represents the modality data for the $M^2C$ task and Un represents a utility score calculated by the weighted sum of the accuracy, energy and latency for the $M^2C$ task, wherein the training dataset of energy model is trained by a neural network, the execution order from one modality to next modality with a highest overall utility score in the training dataset is selected as the execution sequence with the most votes.

15. The sensor system according to claim 14, wherein power and performance probes are inserted between different layers of the neural network.

16. The sensor system according to claim 14, wherein multiple neural network outlets are added to different layers of the neural network to calculate the accuracy of the observation layer with intermediate features.

17. The sensor system according to claim 13, wherein in the power semi-gating mode, if the performance requirements are met, the $M^2C$ task is completed with no more calculations; if the performance requirements are not met, the data is processed based on energy availability, where if energy is insufficient, checkpoints are used to save the execution state and wake up tasks until the accumulated energy exceeds a threshold.

18. The sensor system according to claim 13, wherein the detection and prediction controller is configured to determine whether the next modality needs to be calculated based on the current performance of the multi-modal computing task and the remaining power budget, and if so, the controller processes the data of the next modality in advance by only running the sensor in the most energy-saving mode and actively determine whether to restore the original data of the next sensor and execute the corresponding modal data, where the detection and prediction controller compares the detected data with the modal list.

19. The sensor system according to claim 13, wherein the detection symbol PF(probe) is used to explain the prediction result to predict whether there is remaining energy, $$PF(\text{probe}) = 1(A_{REF} - A_{pred} \leq 0) \quad (1)$$

$$A_{pred} = A_{REF} \times \left(1 - \frac{(A_{REF} - A_{ref}) \times A_{probe}}{A_{REF}}\right) \quad (2)$$

wherein $A_{ref}$ represents the reference performance, and $A_{REF}$ represents the performance for completing the whole modality, $A_{probe}$ represents the performance from the probes, and 1 is a Bool function.

* * * * *